(12) United States Patent
Gschwind et al.

(10) Patent No.: US 9,250,904 B2
(45) Date of Patent: *Feb. 2, 2016

(54) MODIFY AND EXECUTE SEQUENTIAL INSTRUCTION FACILITY AND INSTRUCTIONS THEREFOR

(71) Applicant: International Business Machines Corporation, Armonk, NY (US)

(72) Inventors: Michael K Gschwind, Chappaqua, NY (US); Eric M Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/139,895

(22) Filed: Dec. 24, 2013

(65) Prior Publication Data

US 2014/0164741 A1    Jun. 12, 2014

Related U.S. Application Data

(63) Continuation of application No. 13/710,494, filed on Dec. 11, 2012.

(51) Int. Cl.
  *G06F 9/00* (2006.01)
  *G06F 9/30* (2006.01)
(52) U.S. Cl.
  CPC ........ *G06F 9/30145* (2013.01); *G06F 9/30029* (2013.01)

(58) Field of Classification Search
  CPC .................. G06F 9/30029; G06F 3/30145
  See application file for complete search history.

(56) References Cited

U.S. PATENT DOCUMENTS

| 5,644,744 A | 7/1997 | Mahin et al. |
| 6,604,190 B1 * | 8/2003 | Tran .............................. 712/207 |
| 6,631,488 B1 | 10/2003 | Stambaugh et al. |
| 2009/0328232 A1 | 12/2009 | Safford, III |
| 2011/0238961 A1 | 9/2011 | Banning et al. |

FOREIGN PATENT DOCUMENTS

| CN | 101101544 A | 1/2009 |
| CN | 101911016 A | 12/2010 |

OTHER PUBLICATIONS

PCT International Search Report PCT/CN2013/088188 dated Mar. 20, 2014.
IBM z/Architecture Principles of Operation, SA22-7832-09, Tenth Edition, Sep. 2012.

* cited by examiner

*Primary Examiner* — Zachary K Huson
(74) *Attorney, Agent, or Firm* — William A. Kinnaman, Jr.

(57) ABSTRACT

An modify next sequential instruction (MNSI) instruction, when executed, modifies a field of the fetched copy of the next sequential instruction (NSI) to enable a program to dynamically provide parameters to the NSI being executed. Thus the MNSI instruction is a non-disruptive prefix instruction to the NSI. The NSI may be modified to effectively extend the length of the NSI field, thus providing more registers or more range (in the case of a length field) than otherwise available to the NSI instruction according to the instruction set architecture (ISA).

8 Claims, 25 Drawing Sheets

MODIFY AND EXECUTE SEQUENTIAL INSTRUCTION FACILITY AND INSTRUCTIONS THEREFOR

CROSS-REFERENCE TO RELATED APPLICATIONS

This is a continuation of U.S. patent application Ser. No. 13/710,494 "MODIFY AND EXECUTE NEXT SEQUENTIAL INSTRUCTION FACILITY AND INSTRUCTIONS THEREFOR" filed Dec. 11, 2012, incorporated herein by reference.

FIELD OF THE INVENTION

The present invention is related to computer systems and more particularly to computer system processor instruction functionality.

BACKGROUND OF THE INVENTION

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

IBM has created through the work of many highly talented engineers beginning with machines known as the IBM® System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The IBM z/Architecture® Principles of Operation, Publication SA22-7832-09 is incorporated by reference in its entirety herein.

BRIEF SUMMARY

In a computer system, a computer implemented method is provided comprising: fetching at an address specified by a program counter a prefix machine instruction and a first next sequential instruction (NSI), the prefix machine instruction and the first NSI defined for a computer architecture, the first NSI directly following the prefix machine instruction in program order; and executing the fetched prefix machine instruction and first NSI, the executing comprising: a) modifying a field of the fetched first NSI based on a value specified by the prefix machine instruction to produce a modified first NSI; and b) executing the modified first NSI; and c) incrementing the program counter to point to a second NSI, the second NSI directly following the first NSI in program order; and executing the second NSI.

In an embodiment, the field of the first NSI consists of any one of an immediate field, an index field or a length field.

In an embodiment, the prefix instruction further comprises a first register field, the modifying further comprises: obtaining the value from a register specified by the first register field; and replacing the field of the fetched first NSI with a replacement value based on the value specified by the prefix machine instruction.

In an embodiment, based on the first register field being any one of one or more first register field values, the modifying further comprises: obtaining the value from a low order portion of the register specified by the first register field; performing any one of a logical OR, AND or EXCLUSIVE OR of the value with the field of the fetched first NSI to form the replacement value.

In an embodiment, based on an opcode field of the first NSI comprising bits of the field of the fetched first NSI, executing the fetched prefix machine instruction and first NSI is aborted and an error condition is signaled.

In an embodiment, based on information provided by the prefix machine instruction, a location in the fetched first NSI of the field of the fetched first NSI is determined.

In an embodiment, the information is extracted from a register specified by the prefix machine instruction, the information defining the location of the field of the first NSI.

In an embodiment, the field of the modified NSI is larger than the field of the NSI wherein the field of the modified NSI comprises a value greater than any value supported by the field of the NSI.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1A:
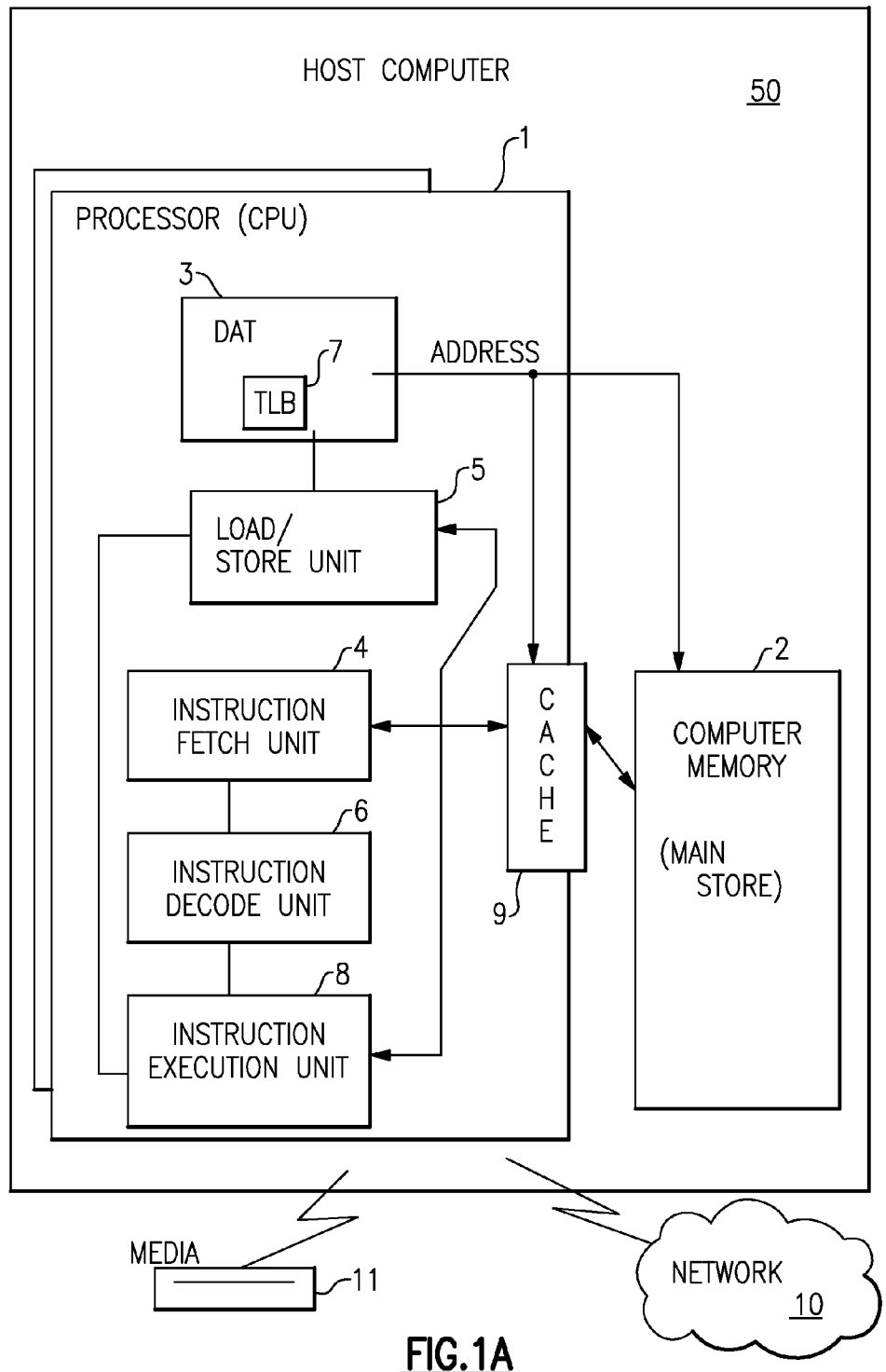
FIG. 1A is a diagram depicting an example Host computer system.

Referring to FIG. 1A, representative components of a Host Computer system 50 are portrayed. Other arrangements of components may also be employed in a computer system, which are well known in the art. The representative Host Computer 50 comprises one or more CPUs 1 in communication with main store (Computer Memory 2) as well as I/O interfaces to storage devices 11 and networks 10 for communicating with other computers or SANs and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit (6) and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

Figure 1B:
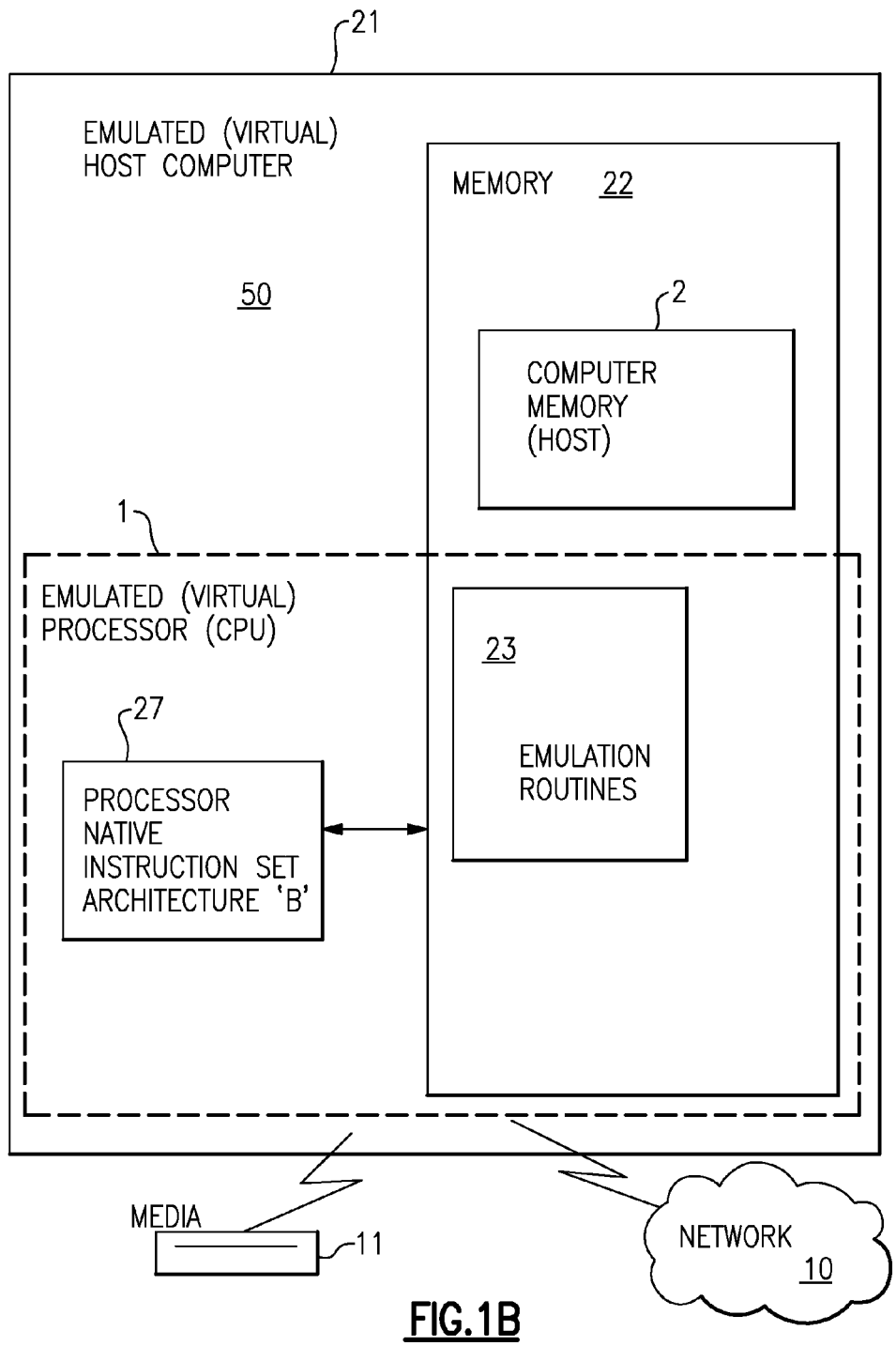
FIG. 1B is a diagram depicting an example emulation Host computer system.

In FIG. 1B, an example of an emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 27 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instruction(s) obtained in a Sequence & Access/Decode routine which may decode the Host instruction(s) accessed to determine a native instruction execution routine for emulating the function of the Host instruction accessed. Other facilities that are defined for the Host Computer System 50 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®, Linux can be used as well as machines which use emulation by Hercules, UMX, FSI (Fundamental Software, Inc.) or Platform Solutions, Inc. (PSI), where generally execution is in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function 23 emulating a function of an emulated processor 1 is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut, all of the forgoing patents are incorporated by reference herein; and many others, illustrate the a variety of known ways to achieve emulation of an instruction format architected for a different machine for a target machine available to those skilled in the art, as well as those commercial software techniques used by those referenced above.

What is needed is new instruction functionality consistent with existing architecture that relieves dependency on architecture resources such as general registers, improves functionality and performance of software versions employing the new instruction.

Referring to FIG. 1A, software program code which embodies the present invention is typically accessed by the processor also known as a CPU (Central Processing Unit) 1 of the system 50 from long-term storage media 7, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the memory 2, and accessed by the processor 1 using the processor bus. Such program code includes an operating system which controls the function and interaction of the various computer components and one or more application programs. Program code is normally paged from dense storage media 11 to high-speed memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 1C:
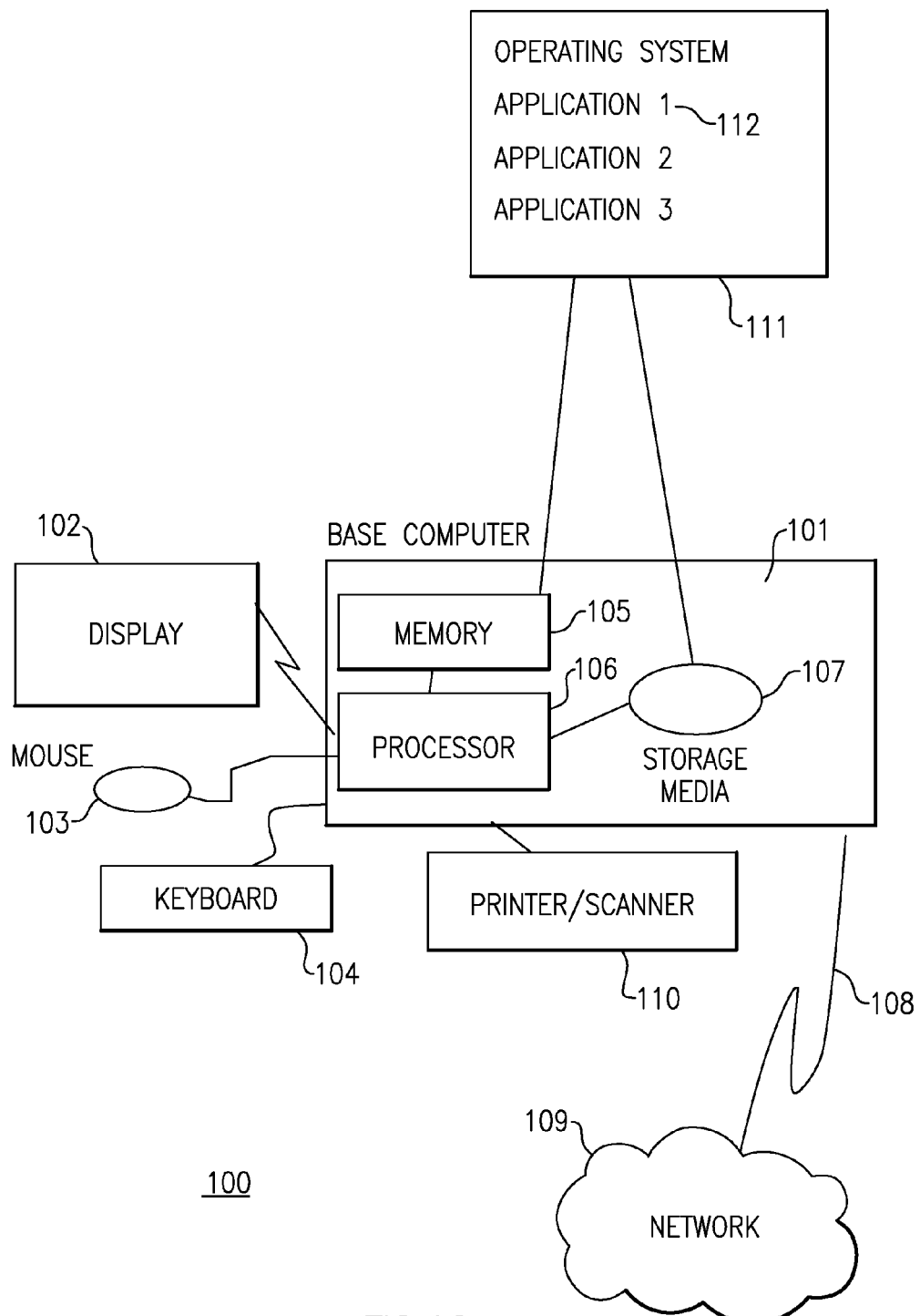
FIG. 1C is a diagram depicting an example computer system.

FIG. 1C illustrates a representative workstation or server hardware system in which the present invention may be practiced. The system 100 of FIG. 1C comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive (including any of magnetic media, CD, DVD and Flash Memory for example) or a tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
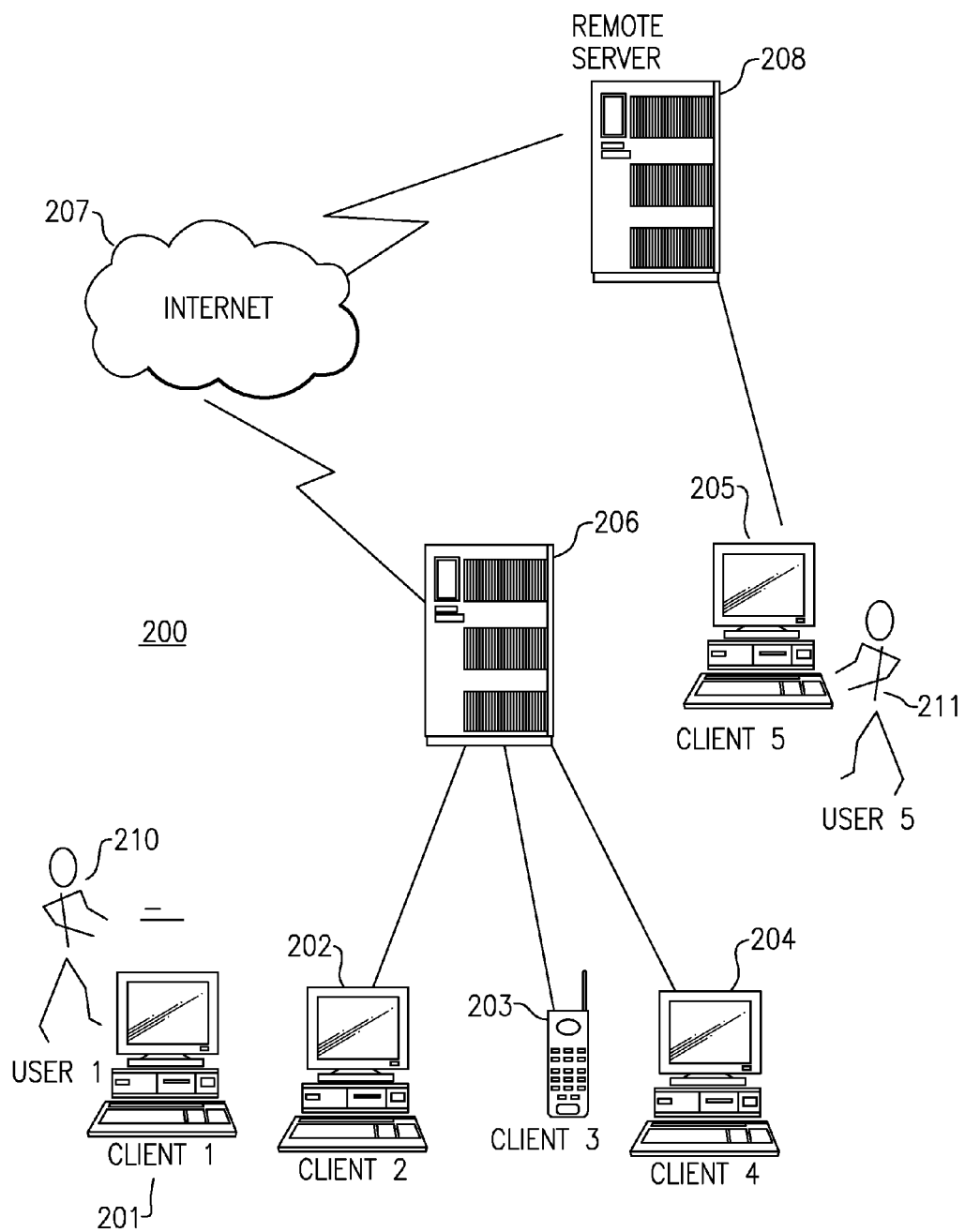
FIG. 2 is a diagram depicting an example computer network.

FIG. 2 illustrates a data processing network 200 in which the present invention may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer™ zSeries® z9® Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 3:
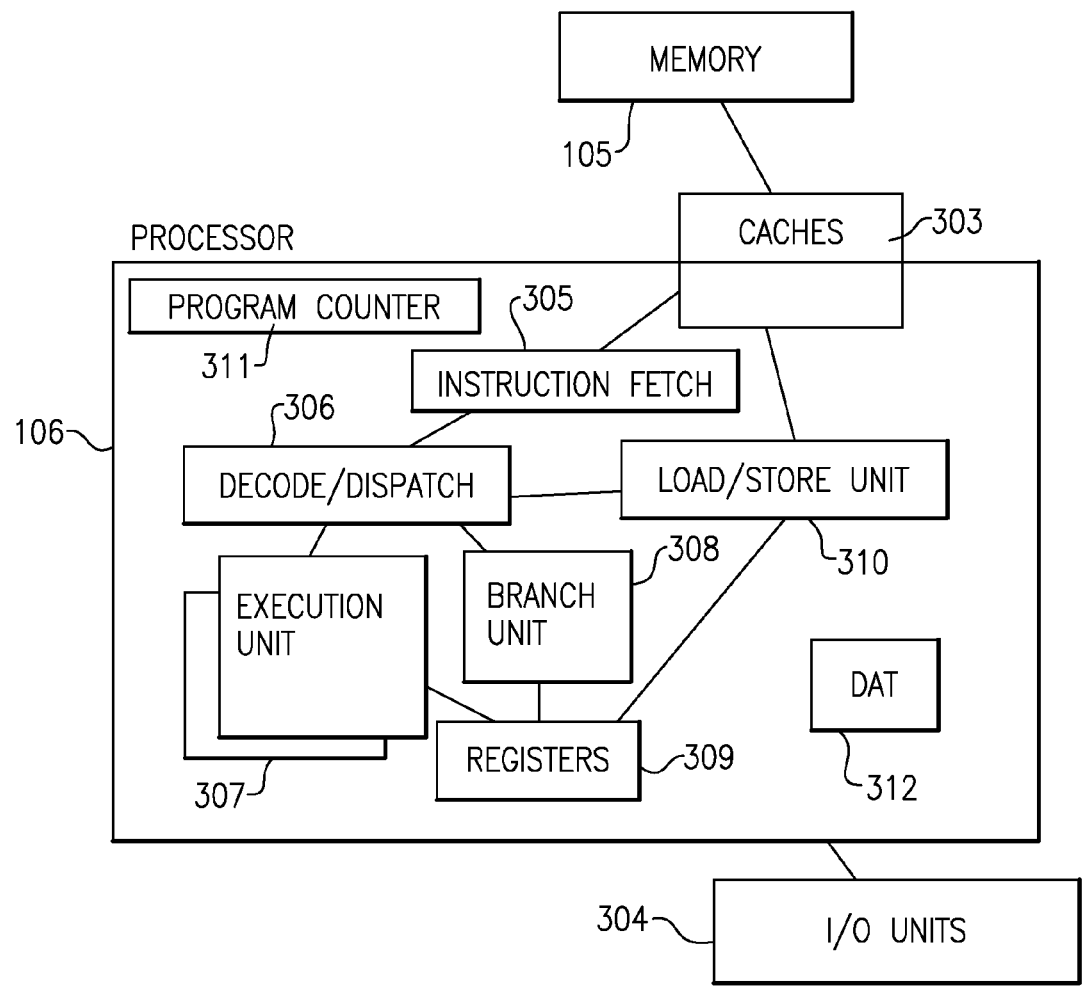
FIG. 3 is a diagram depicting an elements of a computer system.

Referring to FIG. 3, an exemplary processor embodiment is depicted for processor 106. Typically one or more levels of Cache 303 are employed to buffer memory blocks in order to improve processor performance. The cache 303 is a high speed buffer holding cache lines of memory data that are likely to be used. Typical cache lines are 64, 128 or 256 bytes of memory data. Separate Caches are often employed for caching instructions than for caching data. Cache coherence (synchronization of copies of lines in Memory and the Caches) is often provided by various "Snoop" algorithms well known in the art. Main storage 105 of a processor system is often referred to as a cache. In a processor system having 4 levels of cache 303 main storage 105 is sometimes referred to as the level 5 (L5) cache since it is typically faster and only holds a portion of the non-volatile storage (DASD, Tape etc) that is available to a computer system. Main storage 105 "caches" pages of data paged in and out of the main storage 105 by the Operating system.

A program counter (instruction counter) 311 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the Operating system environment). The PSW of the program maintains the program counter value while the program is not active, and the program counter (in the PSW) of the operating system is used while the operating system is executing. Typically the Program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 311 is modified by either a context switch operation or a Branch taken operation of a Branch instruction for example. In a context switch operation, the current program counter value is saved in a Program Status Word (PSW) along with other state information about the program being executed (such as condition codes), and a new program counter value is loaded pointing to an instruction of a new program module to be executed. A branch taken operation is performed in order to permit the program to make decisions or loop within the program by loading the result of the Branch Instruction into the Program Counter 311.

Typically an instruction Fetch Unit 305 is employed to fetch instructions on behalf of the processor 106. The fetch unit either fetches "next sequential instructions", target instructions of Branch Taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 106. In an embodiment, the fetched instruction(s) are passed to a dispatch unit 306 of the fetch unit. The dispatch unit decodes the instruction(s) and forwards information about the decoded instruction(s) to appropriate units 307 308 310. An execution unit 307 will typically receive information about decoded arithmetic instructions from the instruction fetch unit 305 and will perform arithmetic operations on operands according to the opcode of the instruction. Operands are provided to the execution unit 307 preferably either from memory 105, architected registers 309 or from an immediate field of the instruction being executed. Results of the execution, when stored, are stored either in memory 105, registers 309 or in other machine hardware (such as control registers, PSW registers and the like).

Figure 4A:
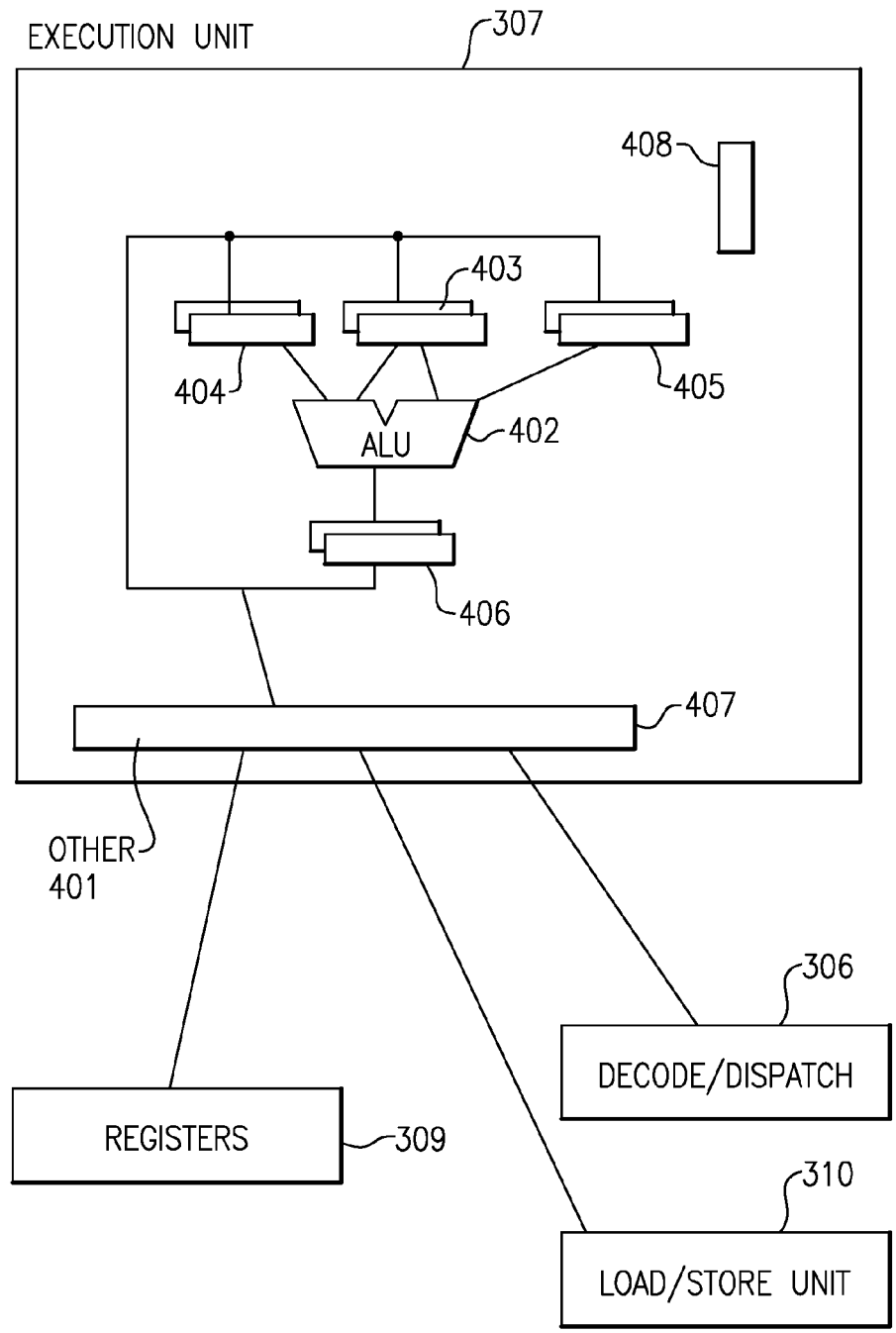
FIGS. 4A-4C depict detailed elements of a computer system.

A processor 106 typically has one or more execution units 307 308 310 for executing the function of the instruction. Referring to FIG. 4A, an execution unit 307 may communicate with architected general registers 309, a decode/dispatch unit 306 a load store unit 310 and other 401 processor units by way of interfacing logic 407. An Execution unit 307 may employ several register circuits 403 404 405 to hold information that the arithmetic logic unit (ALU) 402 will operate on. The ALU performs arithmetic operations such as add, subtract, multiply and divide as well as logical function such as and, or and exclusive-or (xor), rotate and shift. Preferably the ALU supports specialized operations that are design dependent. Other circuits may provide other architected facilities 408 including condition codes and recovery support logic for example. Typically the result of an ALU operation is held in an output register circuit 406 which can forward the result to a variety of other processing functions. There are many arrangements of processor units, the present description is only intended to provide a representative understanding of one embodiment.

An ADD instruction for example would be executed in an execution unit 307 having arithmetic and logical functionality while a Floating Point instruction for example would be executed in a Floating Point Execution having specialized Floating Point capability. Preferably, an execution unit operates on operands identified by an instruction by performing an opcode defined function on the operands. For example, an ADD instruction may be executed by an execution unit 307 on operands found in two registers 309 identified by register fields of the instruction.

The execution unit 307 performs the arithmetic addition on two operands and stores the result in a third operand where the third operand may be a third register or one of the two source registers. The Execution unit preferably utilizes an Arithmetic Logic Unit (ALU) 402 that is capable of performing a variety of logical functions such as Shift, Rotate, And, Or and XOR as well as a variety of algebraic functions including any of add, subtract, multiply, divide. Some ALUs 402 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 4B:
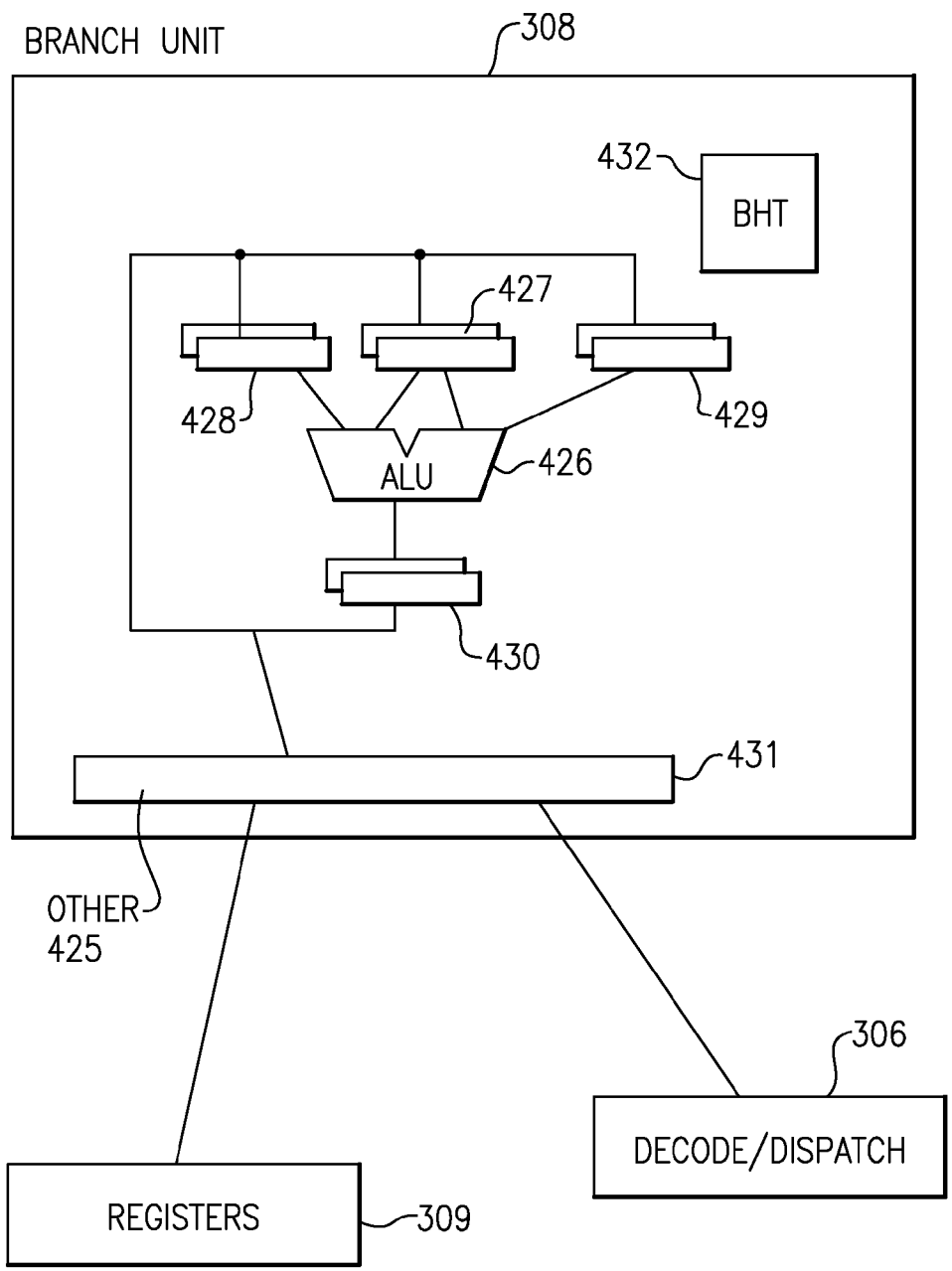

Referring to FIG. 4B, Branch instruction information for executing a branch instruction is typically sent to a branch unit 308 which often employs a branch prediction algorithm such as a branch history table 432 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 308 may employ an ALU 426 having a plurality of input register circuits 427 428 429 and an output register circuit 430. The branch unit 308 may communicate with general registers 309, decode dispatch unit 306 or other circuits 425 for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment) for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a Base register, an Index register and an immediate field (displacement field) that are added together to provide the address of the operand in memory for example. Location herein typically implies a location in main memory (main storage) unless otherwise indicated.

Figure 4C:
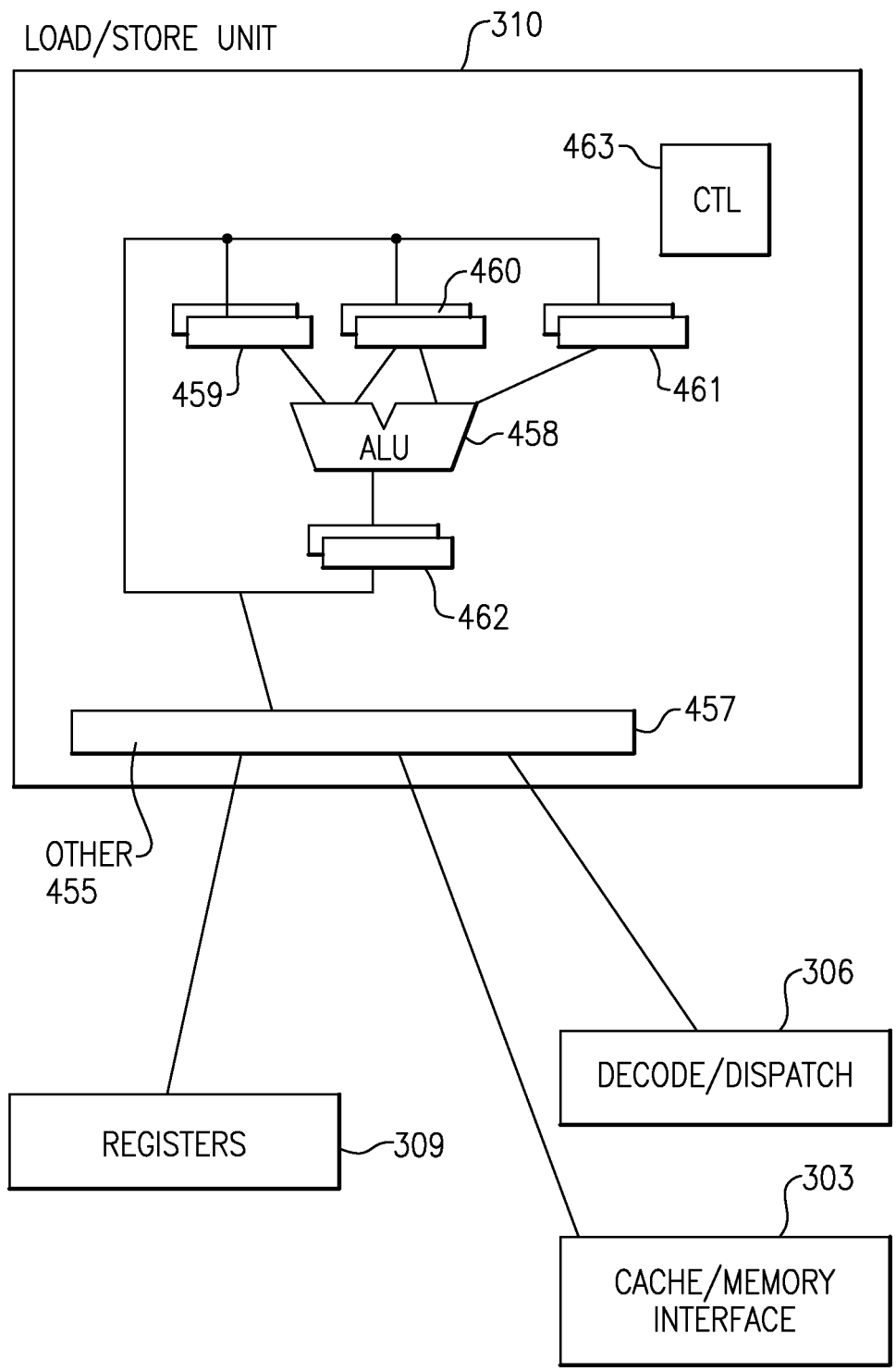
Figure 5A:
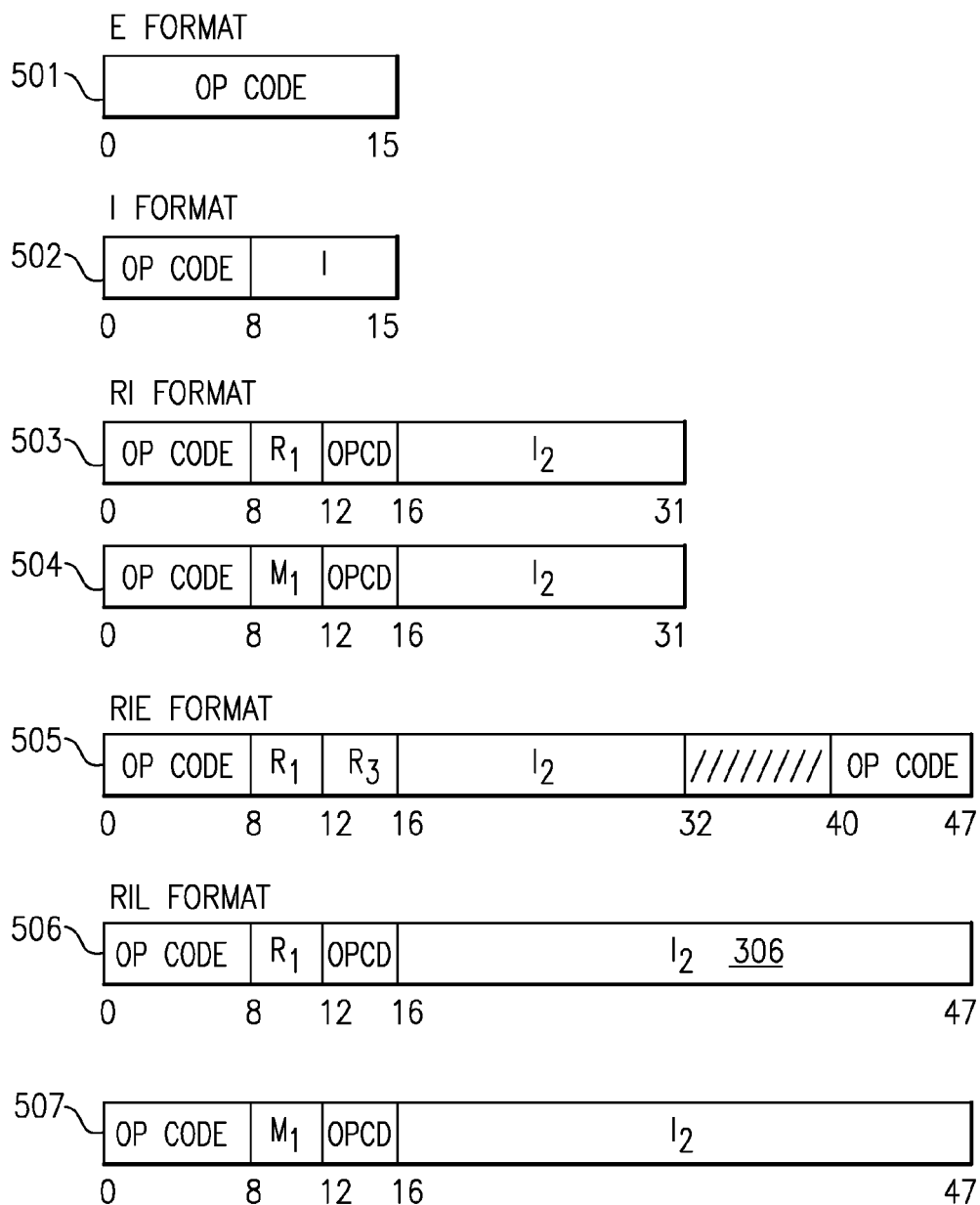
FIGS. 5A-5F depict machine instruction format of a computer system.
Figure 5B:
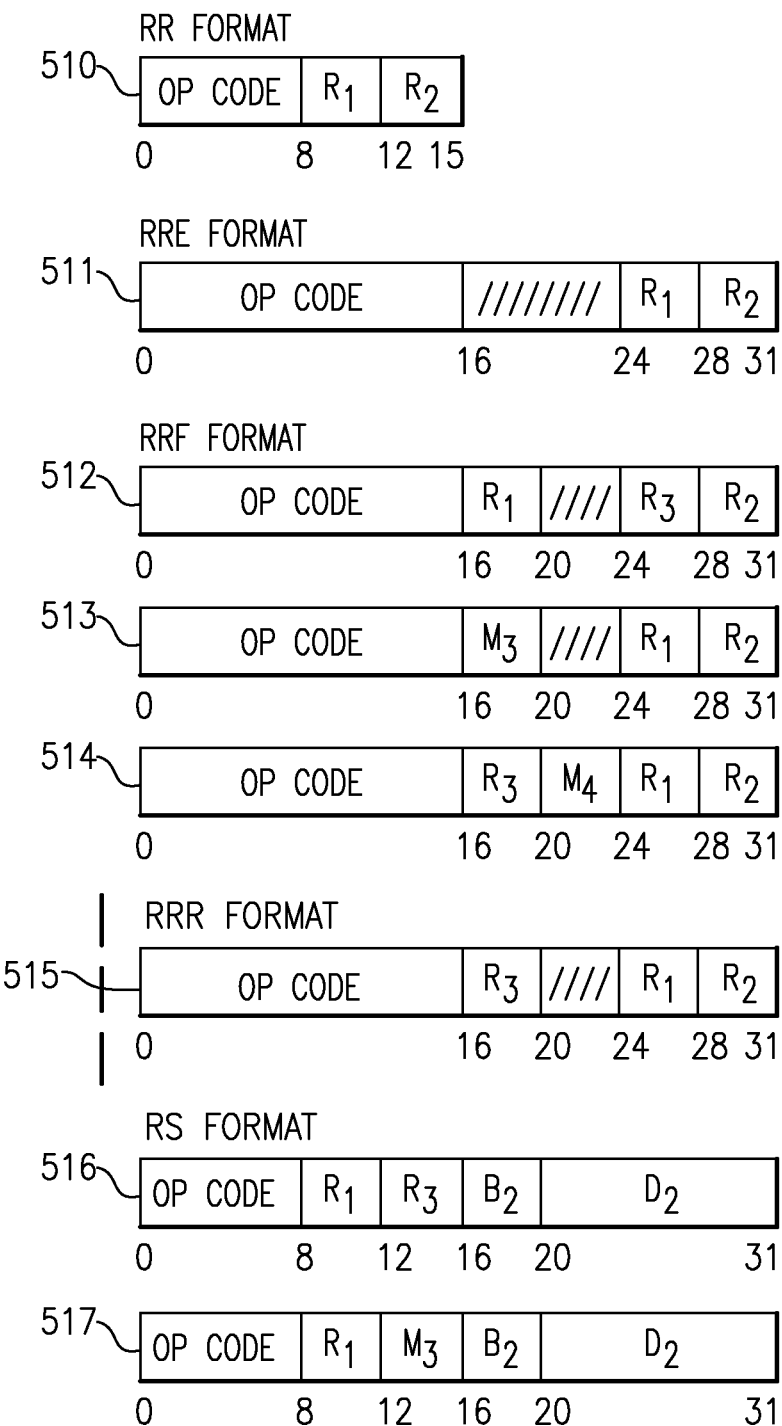
Figure 5C:
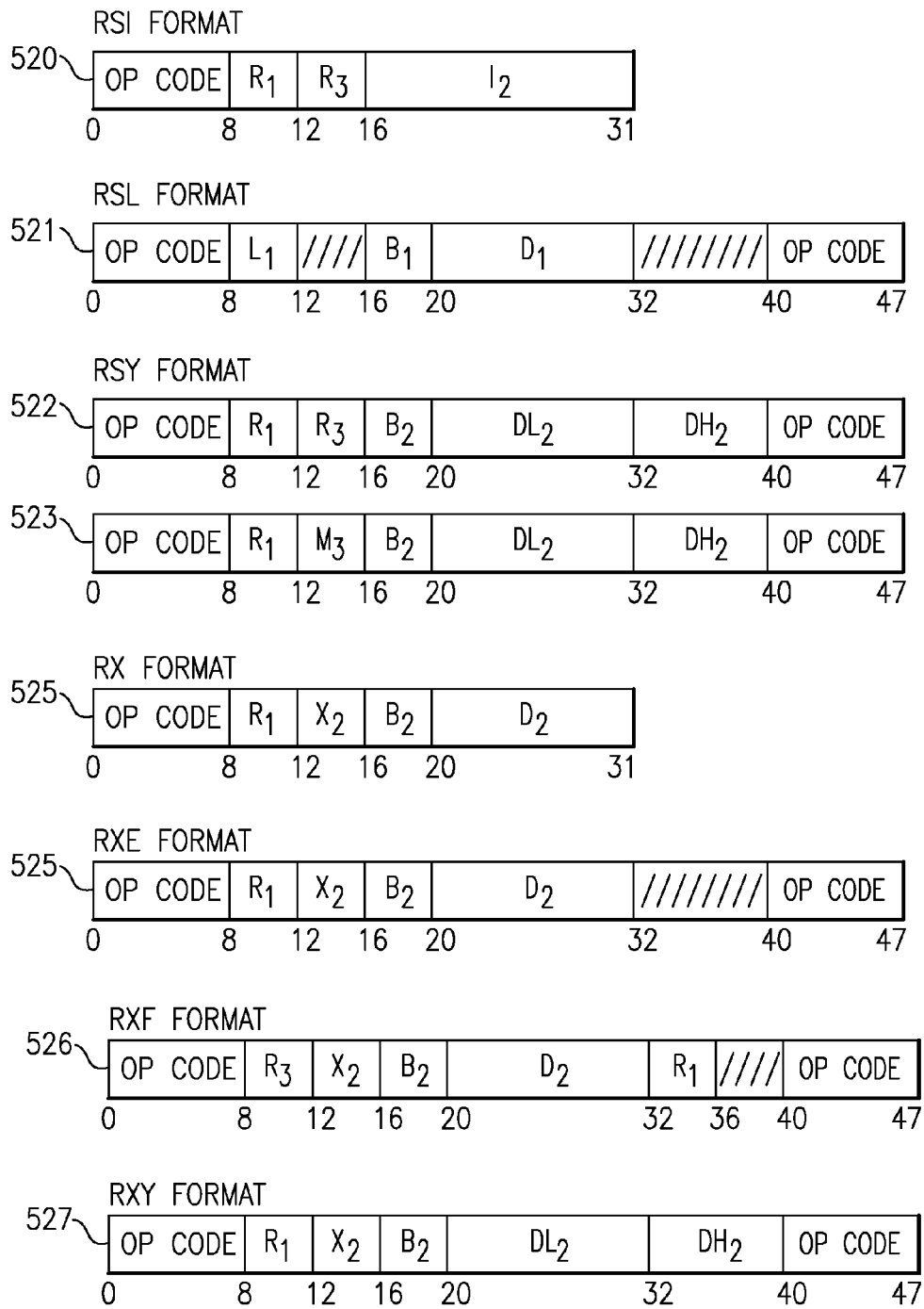
Figure 5D:
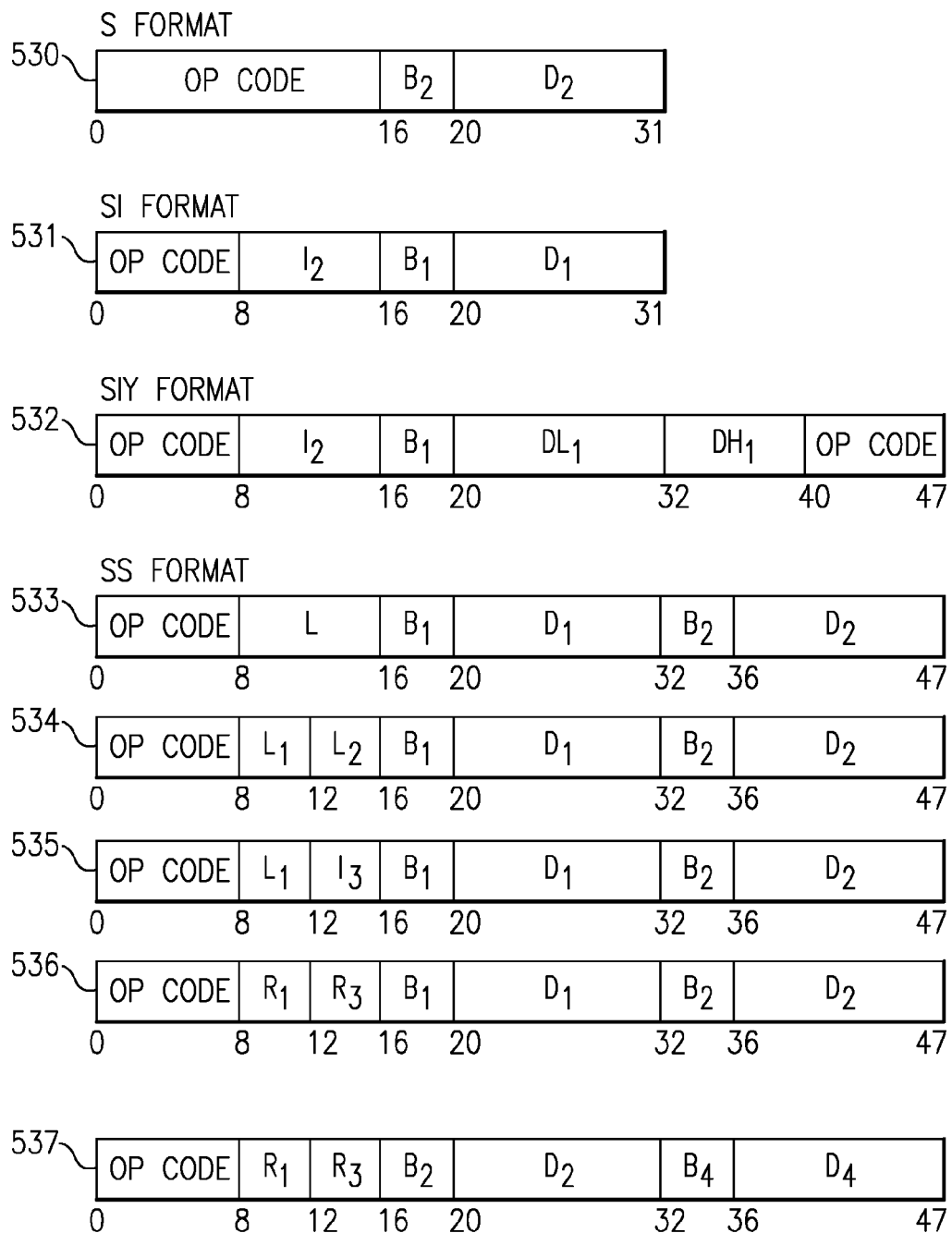
Figure 5E:
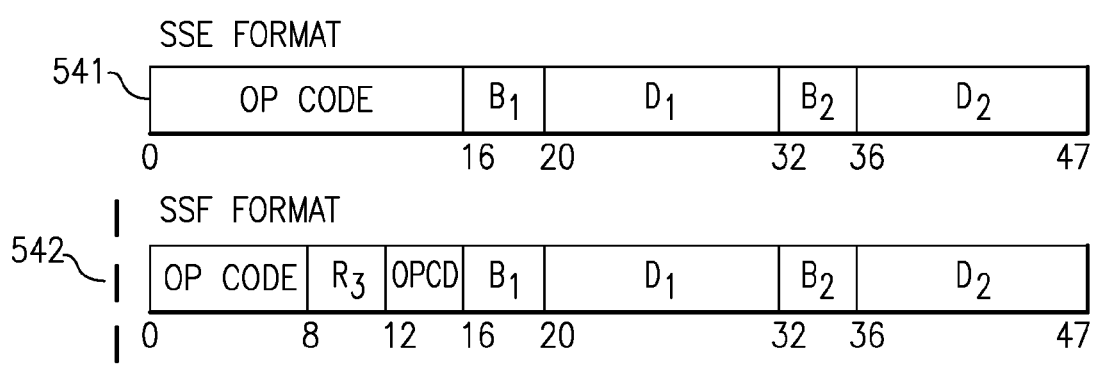
Figure 5F:
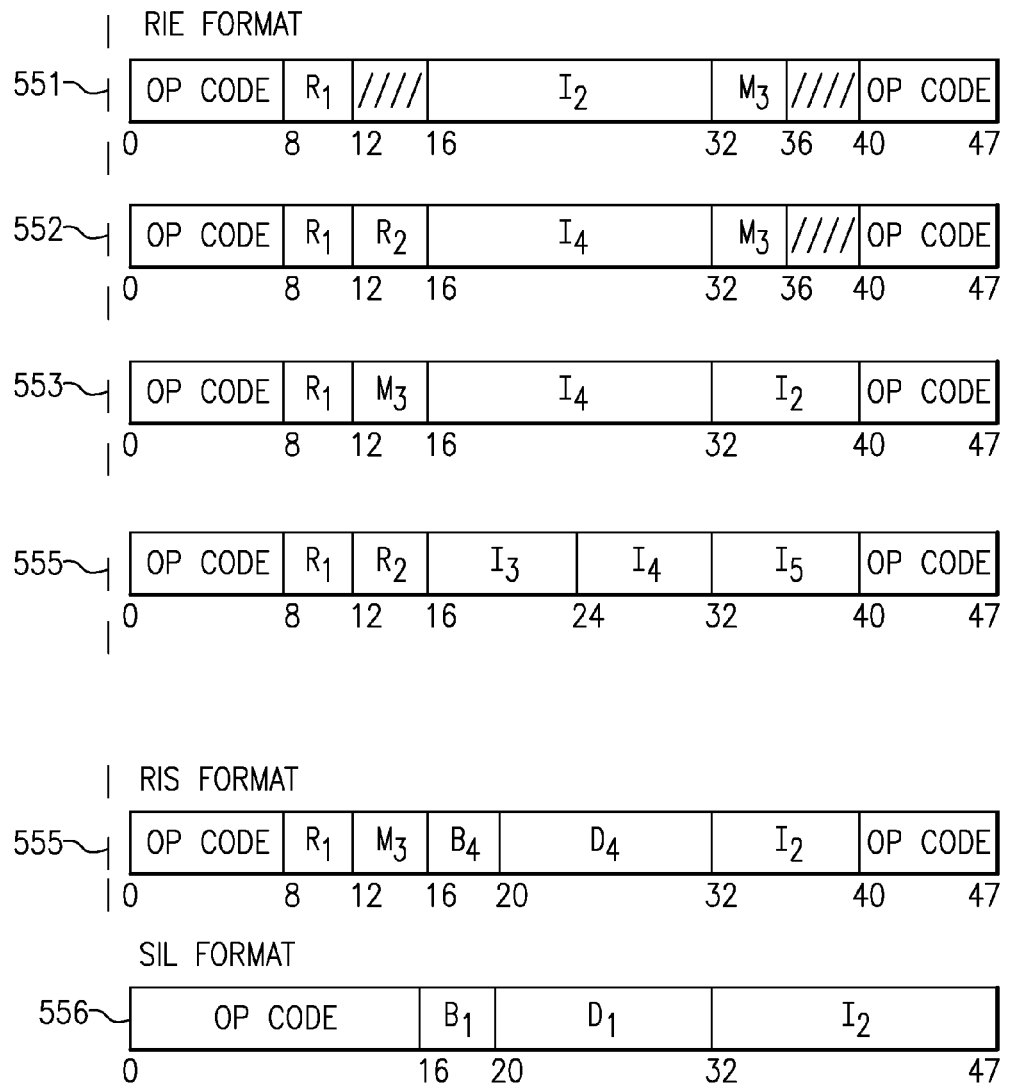

Referring to FIG. 4C, a processor accesses storage using a Load/Store unit 310. The Load/Store unit 310 may perform a Load operation by obtaining the address of the target operand in memory 303 and loading the operand in a register 309 or another memory 303 location, or may perform a Store operation by obtaining the address of the target operand in memory 303 and storing data obtained from a register 309 or another memory 303 location in the target operand location in memory 303. The Load/Store unit 310 may be speculative and may access memory in a sequence that is out-of-order relative to instruction sequence, however the Load/Store unit 310 must maintain the appearance to programs that instructions were executed in order. A load/store unit 310 may communicate with general registers 309, decode/dispatch unit 306, Cache/Memory interface 303 or other elements 455 and comprises various register circuits, ALUs 458 and control logic 463 to calculate storage addresses and to provide pipeline sequencing to keep operations in-order. Some operations may be out of order but the Load/Store unit provides functionality to make the out of order operations to appear to the program as having been performed in order as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of Dynamic Address Translation (DAT) 312 technologies including, but not limited to simply prefixing a virtual address with an offset value, translating the virtual address via one or more translation tables, the translation tables preferably comprising at least a segment table and a page table alone or in combination, preferably, the segment table having an entry pointing to the page table. In z/Architecture, a hierarchy of translation is provided including a region first table, a region second table, a region third table, a segment table and an optional page table. The performance of the address translation is often improved by utilizing a Translation Look-aside Buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential Translation table accesses. TLB content may be managed by a variety of replacement algorithms including LRU (Least Recently used).

In the case where the Processor is a processor of a multi-processor system, each processor has responsibility to keep shared resources such as I/O, caches, TLBs and Memory interlocked for coherency. Typically "snoop" technologies will be utilized in maintaining cache coherency. In a snoop environment, each cache line may be marked as being in any one of a shared state, an exclusive state, a changed state, an invalid state and the like in order to facilitate sharing.

I/O units 304 provide the processor with means for attaching to peripheral devices including Tape, Disc, Printers, Displays, and networks for example. I/O units are often presented to the computer program by software Drivers. In Mainframes such as the z/Series from IBM, Channel Adapters and Open System Adapters are I/O units of the Mainframe that provide the communications between the operating system and peripheral devices.

The following description from the z/Architecture Principles of Operation describes an architectural view of a computer system:

Storage:

A computer system includes information in main storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs must be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed. When used in a CPU operation, a group of bytes is called a field. Within each group of bytes, bits are numbered in a left-to-right sequence. The leftmost bits are sometimes referred to as the "high-order" bits and the rightmost bits as the "low-order" bits. Bit numbers are not storage addresses, however. Only bytes can be addressed. To operate on individual bits of a byte in storage, it is necessary to access the entire byte. The bits in a byte are numbered 0 through 7, from left to right. The bits in an address may be numbered 8-31 or 40-63 for 24-bit addresses or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte. When information is placed in storage, the contents of only those byte locations are replaced that are included in the designated field, even though the width of the physical path to storage may be greater than the length of the field being stored.

Certain units of information must be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions must be on two-byte integral boundaries. The storage operands of most instructions do not have boundary-alignment requirements.

On models that implement separate caches for instructions and data operands, a significant delay may be experienced if the program stores into a cache line from which instructions are subsequently fetched, regardless of whether the store alters the instructions that are subsequently fetched.
Instructions:

Typically, operation of the CPU is controlled by instructions in storage that are executed sequentially, one at a time, left to right in an ascending sequence of storage addresses. A change in the sequential operation may be caused by branching, LOAD PSW, interruptions, SIGNAL PROCESSOR orders, or manual intervention.

Preferably an instruction comprises two major parts:
 An operation code (op code), which specifies the operation to be performed
 Optionally, the designation of the operands that participate.
Instruction formats of the z/Architecture are shown in FIGS. 5A-5F. An instruction can simply provide an Opcode 501, or an opcode and a variety of fields including immediate operands or register specifiers for locating operands in registers or in memory. The Opcode can indicate to the hardware that implied resources (operands etc.) are to be used such as one or more specific general purpose registers (GPRs). Operands can be grouped in three classes: operands located in registers, immediate operands, and operands in storage. Operands may be either explicitly or implicitly designated. Register operands can be located in general, floating-point, access, or control registers, with the type of register identified by the op code. The register containing the operand is specified by identifying the register in a four-bit field, called the R field, in the instruction. For some instructions, an operand is located in an implicitly designated register, the register being implied by the op code. Immediate operands are contained within the instruction, and the 8-bit, 16-bit, or 32-bit field containing the immediate operand is called the I field. Operands in storage may have an implied length; be specified by a bit mask; be specified by a four-bit or eight-bit length specification, called the L field, in the instruction; or have a length specified by the contents of a general register. The addresses of operands in storage are specified by means of a format that uses the contents of a general register as part of the address. This makes it possible to:

1. Specify a complete address by using an abbreviated notation
2. Perform address manipulation using instructions which employ general registers for operands
3. Modify addresses by program means without alteration of the instruction stream
4. Operate independent of the location of data areas by directly using addresses received from other programs The address used to refer to storage either is contained in a register designated by the R field in the instruction or is calculated from a base address, index, and displacement, specified by the B, X, and D fields, respectively, in the instruction. When the CPU is in the access-register mode, a B or R field may designate an access register in addition to being used to specify an address. To describe the execution of instructions, operands are preferably designated as first and second operands and, in some cases, third and fourth operands. In general, two operands participate in an instruction execution, and the result replaces the first operand.

An instruction is one, two, or three halfwords in length and must be located in storage on a halfword boundary. Referring to FIGS. 5A-5F depicting instruction formats, each instruction is in one of 25 basic formats: E 501, I 502, RI 503 504, RIE 505 551 552 553 554, RIL 506 507, RIS 555, RR 510, RRE 511, RRF 512 513 514, RRS, RS 516 517, RSI 520, RSL 521, RSY 522 523, RX 524, RXE 525, RXF 526, RXY 527, S 530, SI 531, SIL 556, SIY 532, SS 533 534 535 536 537, SSE 541 and SSF 542, with three variations of RRF, two of RI, RIL, RS, and RSY, five of RIE and SS.

The format names indicate, in general terms, the classes of operands which participate in the operation and some details about fields:

RIS denotes a register-and-immediate operation and a storage operation.

RRS denotes a register-and-register operation and a storage operation.

SIL denotes a storage-and-immediate operation, with a 16-bit immediate field.

In the I, RR, RS, RSI, RX, SI, and SS formats, the first byte of an instruction contains the op code. In the E, RRE, RRF, S, SIL, and SSE formats, the first two bytes of an instruction contain the op code, except that for some instructions in the S format, the op code is in only the first byte. In the RI and RIL formats, the op code is in the first byte and bit positions 12-15 of an instruction. In the RIE, RIS, RRS, RSL, RSY, RXE, RXF, RXY, and SIY formats, the op code is in the first byte and the sixth byte of an instruction. The first two bits of the first or only byte of the op code specify the length and format of the instruction, as follows:

In the RR, RRE, RRF, RRR, RX, RXE, RXF, RXY, RS, RSY, RSI, RI, RIE, and RIL formats, the contents of the register designated by the R1. field are called the first operand. The register containing the first operand is sometimes referred to as the "first operand location," and sometimes as "register R1". In the RR, RRE, RRF and RRR formats, the R2 field designates the register containing the second operand, and the R2 field may designate the same register as R1. In the RRF, RXF, RS, RSY, RSI, and RIE formats, the use of the R3 field depends on the instruction. In the RS and RSY formats, the R3 field may instead be an M3 field specifying a mask. The R field designates a general or access register in the general instructions, a general register in the control instructions, and a floating-point register or a general register in the floating-point instructions. For general and control registers, the register operand is in bit positions 32-63 of the 64-bit register or occupies the entire register, depending on the instruction.

In the I format, the contents of the eight-bit immediate-data field, the I field of the instruction, are directly used as the operand. In the SI format, the contents of the eight-bit immediate-data field, the I2 field of the instruction, are used directly as the second operand. The B1 and D1 fields specify the first operand, which is one byte in length. In the SIY format, the operation is the same except that DH1 and DL1 fields are used instead of a D1 field. In the RI format for the instructions ADD HALFWORD IMMEDIATE, COMPARE HALFWORD IMMEDIATE, LOAD HALFWORD IMMEDIATE, and MULTIPLY HALFWORD IMMEDIATE, the contents of the 16-bit I2 field of the instruction are used directly as a signed binary integer, and the R1 field specifies the first operand, which is 32 or 64 bits in length, depending on the instruction. For the instruction TEST UNDER MASK (TMHH, TMHL, TMLH, TMLL), the contents of the I2 field are used as a mask, and the R1 field specifies the first operand, which is 64 bits in length.

For the instructions INSERT IMMEDIATE, AND IMMEDIATE, OR IMMEDIATE, and LOAD LOGICAL IMMEDIATE, the contents of the I2 field are used as an unsigned binary integer or a logical value, and the R1 field specifies the first operand, which is 64 bits in length. For the relative-branch instructions in the RI and RSI formats, the contents of the 16-bit I2 field are used as a signed binary integer designating a number of halfwords. This number, when added to the address of the branch instruction, specifies the branch address. For relative-branch instructions in the RIL format, the I2 field is 32 bits and is used in the same way.

For the relative-branch instructions in the RI and RSI formats, the contents of the 16-bit I2 field are used as a signed binary integer designating a number of halfwords. This number, when added to the address of the branch instruction, specifies the branch address. For relative-branch instructions in the RIL format, the I2 field is 32 bits and is used in the same way. For the RIE-format instructions COMPARE IMMEDIATE AND BRANCH RELATIVE and COMPARE LOGICAL IMMEDIATE AND BRANCH RELATIVE, the contents of the 8-bit I2 field is used directly as the second operand. For the RIE-format instructions COMPARE IMMEDIATE AND BRANCH, COMPARE IMMEDIATE AND TRAP, COMPARE LOGICAL IMMEDIATE AND BRANCH, and COMPARE LOGICAL IMMEDIATE AND TRAP, the contents of the 16-bit I2 field are used directly as the second operand. For the RIE-format instructions COMPARE AND BRANCH RELATIVE, COMPARE IMMEDIATE AND BRANCH RELATIVE, COMPARE LOGICAL AND BRANCH RELATIVE, and COMPARE LOGICAL IMMEDIATE AND BRANCH RELATIVE, the contents of the 16-bit I4 field are used as a signed binary integer designating a number of halfwords that are added to the address of the instruction to form the branch address.

For the RIL-format instructions ADD IMMEDIATE, ADD LOGICAL IMMEDIATE, ADD LOGICAL WITH SIGNED IMMEDIATE, COMPARE IMMEDIATE, COMPARE LOGICAL IMMEDIATE, LOAD IMMEDIATE, and MULTIPLY SINGLE IMMEDIATE, the contents of the 32-bit I2 field are used directly as a the second operand.

For the RIS-format instructions, the contents of the 8-bit I2 field are used directly as the second operand. In the SIL format, the contents of the 16-bit I2 field are used directly as the second operand. The B1 and D1 fields specify the first operand, as described below.

In the RSL, SI, SIL, SSE, and most SS formats, the contents of the general register designated by the B1 field are added to the contents of the D1 field to form the first-operand address. In the RS, RSY, S, SIY, SS, and SSE formats, the contents of the general register designated by the B2 field are added to the contents of the D2 field or DH2 and DL2 fields to form the second-operand address. In the RX, RXE, RXF, and RXY formats, the contents of the general registers designated by the X2 and B2 fields are added to the contents of the D2 field or DH2 and DL2 fields to form the second-operand address. In the RIS and RRS formats, and in one SS format, the contents of the general register designated by the B4 field are added to the contents of the D4 field to form the fourth-operand address.

In the SS format with a single, eight-bit length field, for the instructions AND (NC), EXCLUSIVE OR (XC), MOVE (MVC), MOVE NUMERICS, MOVE ZONES, and OR (OC), L specifies the number of additional operand bytes to the right of the byte designated by the first-operand address. Therefore, the length in bytes of the first operand is 1-256, corresponding to a length code in L of 0-255. Storage results replace the first operand and are never stored outside the field specified by the address and length. In this format, the second operand has the same length as the first operand. There are variations of the preceding definition that apply to EDIT, EDIT AND MARK, PACK ASCII, PACK UNICODE, TRANSLATE, TRANSLATE AND TEST, UNPACK ASCII, and UNPACK UNICODE.

In the SS format with two length fields, and in the RSL format, L1 specifies the number of additional operand bytes to the right of the byte designated by the first-operand address. Therefore, the length in bytes of the first operand is 1-16, corresponding to a length code in L1 of 0-15. Similarly, L2 specifies the number of additional operand bytes to the right of the location designated by the second-operand address Results replace the first operand and are never stored outside the field specified by the address and length. If the first operand is longer than the second, the second operand is extended on the left with zeros up to the length of the first operand. This extension does not modify the second operand in storage. In the SS format with two R fields, as used by the MOVE TO PRIMARY, MOVE TO SECONDARY, and MOVE WITH KEY instructions, the contents of the general register specified by the R1 field are a 32-bit unsigned value called the true length. The operands are both of a length called the effective length. The effective length is equal to the true length or 256, whichever is less. The instructions set the condition code to facilitate programming a loop to move the total number of bytes specified by the true length. The SS format with two R fields is also used to specify a range of registers and two storage operands for the LOAD MULTIPLE DISJOINT instruction and to specify one or two registers and one or two storage operands for the PERFORM LOCKED OPERATION instruction.

A zero in any of the B1, B2, X2, or B4 fields indicates the absence of the corresponding address component. For the absent component, a zero is used informing the intermediate sum, regardless of the contents of general register 0. A displacement of zero has no special significance.

Bits 31 and 32 of the current PSW are the addressing-mode bits. Bit 31 is the extended-addressing mode bit, and bit 32 is the basic-addressing-mode bit. These bits control the size of the effective address produced by address generation. When bits 31 and 32 of the current PSW both are zeros, the CPU is in the 24-bit addressing mode, and 24-bit instruction and operand effective addresses are generated. When bit 31 of the current PSW is zero and bit 32 is one, the CPU is in the 31-bit addressing mode, and 31-bit instruction and operand effective addresses are generated. When bits 31 and 32 of the current PSW are both one, the CPU is in the 64-bit addressing mode, and 64-bit instruction and operand effective addresses are generated. Execution of instructions by the CPU involves generation of the addresses of instructions and operands.

When an instruction is fetched from the location designated by the current PSW, the instruction address is increased by the number of bytes in the instruction, and the instruction is executed. The same steps are then repeated by using the new value of the instruction address to fetch the next instruction in the sequence. In the 24-bit addressing mode, instruction addresses wrap around, with the halfword at instruction address $2^{24}$-2 being followed by the halfword at instruction address 0. Thus, in the 24-bit addressing mode, any carry out of PSW bit position 104, as a result of updating the instruction address, is lost. In the 31-bit or 64-bit addressing mode, instruction addresses similarly wrap around, with the halfword at instruction address $2^{31}$-2 or $2^{64}$-2, respectively, followed by the halfword at instruction address 0. A carry out of PSW bit position 97 or 64, respectively, is lost.

An operand address that refers to storage is derived from an intermediate value, which either is contained in a register designated by an R field in the instruction or is calculated from the sum of three binary numbers: base address, index, and displacement. The base address (B) is a 64-bit number contained in a general register specified by the program in a four bit field, called the B field, in the instruction. Base addresses can be used as a means of independently addressing each program and data area. In array type calculations, it can designate the location of an array, and, in record-type processing, it can identify the record. The base address provides for addressing the entire storage. The base address may also be used for indexing.

The index (X) is a 64-bit number contained in a general register designated by the program in a four-bit field, called the X field, in the instruction. It is included only in the address specified by the RX-, RXE-, and RXY-format instructions. The RX-, RXE-, RXF-, and RXY-format instructions permit double indexing; that is, the index can be used to provide the address of an element within an array.

The displacement (D) is a 12-bit or 20-bit number contained in a field, called the D field, in the instruction. A 12-bit displacement is unsigned and provides for relative addressing of up to 4,095 bytes beyond the location designated by the base address. A 20-bit displacement is signed and provides for relative addressing of up to 524,287 bytes beyond the base address location or of up to 524,288 bytes before it. In array-type calculations, the displacement can be used to specify one of many items associated with an element. In the processing of records, the displacement can be used to identify items within a record. A 12-bit displacement is in bit positions 20-31 of instructions of certain formats. In instructions of some formats, a second 12-bit displacement also is in the instruction, in bit positions 36-47.

A 20-bit displacement is in instructions of only the RSY, RXY, or SIY format. In these instructions, the D field consists of a DL (low) field in bit positions 20-31 and of a DH (high) field in bit positions 32-39. When the long-displacement facility is installed, the numeric value of the displacement is formed by appending the contents of the DH field on the left of the contents of the DL field. When the long-displacement facility is not installed, the numeric value of the displacement is formed by appending eight zero bits on the left of the contents of the DL field, and the contents of the DH field are ignored.

In forming the intermediate sum, the base address and index are treated as 64-bit binary integers. A 12-bit displacement is treated as a 12-bit unsigned binary integer, and 52 zero bits are appended on the left. A 20-bit displacement is treated as a 20-bit signed binary integer, and 44 bits equal to the sign bit are appended on the left. The three are added as 64-bit binary numbers, ignoring overflow. The sum is always 64 bits long and is used as an intermediate value to form the generated address. The bits of the intermediate value are numbered 0-63. A zero in any of the B1, B2, X2, or B4 fields indicates the absence of the corresponding address component. For the absent component, a zero is used in forming the intermediate sum, regardless of the contents of general register 0. A displacement of zero has no special significance.

When an instruction description specifies that the contents of a general register designated by an R field are used to address an operand in storage, the register contents are used as the 64-bit intermediate value.

An instruction can designate the same general register both for address computation and as the location of an operand. Address computation is completed before registers, if any, are changed by the operation. Unless otherwise indicated in an individual instruction definition, the generated operand address designates the leftmost byte of an operand in storage.

The generated operand address is always 64 bits long, and the bits are numbered 0-63. The manner in which the generated address is obtained from the intermediate value depends on the current addressing mode. In the 24-bit addressing mode, bits 0-39 of the intermediate value are ignored, bits 0-39 of the generated address are forced to be zeros, and bits 40-63 of the intermediate value become bits 40-63 of the generated address. In the 31-bit addressing mode, bits 0-32 of the intermediate value are ignored, bits 0-32 of the generated address are forced to be zero, and bits 33-63 of the intermediate value become bits 33-63 of the generated address. In the 64-bit addressing mode, bits 0-63 of the intermediate value become bits 0-63 of the generated address. Negative values may be used in index and base-address registers. Bits 0-32 of these values are ignored in the 31-bit addressing mode, and bits 0-39 are ignored in the 24-bit addressing mode.

For branch instructions, the address of the next instruction to be executed when the branch is taken is called the branch address. Depending on the branch instruction, the instruction format may be RR, RRE, RX, RXY, RS, RSY, RSI, RI, RIE, or RIL. In the RS, RSY, RX, and RXY formats, the branch address is specified by a base address, a displacement, and, in the RX and RXY formats, an index. In these formats, the generation of the intermediate value follows the same rules as for the generation of the operand-address intermediate value. In the RR and RRE formats, the contents of the general register designated by the R2 field are used as the intermediate value from which the branch address is formed. General register 0 cannot be designated as containing a branch address. A value of zero in the R2 field causes the instruction to be executed without branching.

The relative-branch instructions are in the RSI, RI, RIE, and RIL formats. In the RSI, RI, and RIE formats for the relative-branch instructions, the contents of the I2 field are treated as a 16-bit signed binary integer designating a number of halfwords. In the RIL format, the contents of the I2 field are treated as a 32-bit signed binary integer designating a number of halfwords. The branch address is the number of halfwords designated by the I2 field added to the address of the relative-branch instruction.

The 64-bit intermediate value for a relative branch instruction in the RSI, RI, RIE, or RIL format is the sum of two addends, with overflow from bit position 0 ignored. In the RSI, RI, or RIE format, the first addend is the contents of the I2 field with one zero bit appended on the right and 47 bits equal to the sign bit of the contents appended on the left, except that for COMPARE AND BRANCH RELATIVE, COMPARE IMMEDIATE AND BRANCH RELATIVE, COMPARE LOGICAL AND BRANCH RELATIVE and COMPARE LOGICAL IMMEDIATE AND BRANCH RELATIVE, the first addend is the contents of the I4 field, with bits appended as described above for the I2 field. In the RIL format, the first addend is the contents of the I2 field with one zero bit appended on the right and 31 bits equal to the sign bit of the contents appended on the left. In all formats, the second addend is the 64-bit address of the branch instruction. The address of the branch instruction is the instruction address in the PSW before that address is updated to address the next sequential instruction, or it is the address of the target of the EXECUTE instruction if EXECUTE is used. If EXECUTE is used in the 24-bit or 31-bit addressing mode, the address of the branch instruction is the target address with 40 or 33 zeros, respectively, appended on the left.

The branch address is always 64 bits long, with the bits numbered 0-63. The branch address replaces bits 64-127 of the current PSW. The manner in which the branch address is obtained from the intermediate value depends on the addressing mode. For those branch instructions which change the addressing mode, the new addressing mode is used. In the 24-bit addressing mode, bits 0-39 of the intermediate value are ignored, bits 0-39 of the branch address are made zeros, and bits 40-63 of the intermediate value become bits 40-63 of the branch address. In the 31-bit addressing mode, bits 0-32 of the intermediate value are ignored, bits 0-32 of the branch address are made zeros, and bits 33-63 of the intermediate value become bits 33-63 of the branch address. In the 64-bit addressing mode, bits 0-63 of the intermediate value become bits 0-63 of the branch address.

For several branch instructions, branching depends on satisfying a specified condition. When the condition is not satisfied, the branch is not taken, normal sequential instruction execution continues, and the branch address is not used. When a branch is taken, bits 0-63 of the branch address replace bits 64-127 of the current PSW. The branch address is not used to access storage as part of the branch operation. A specification exception due to an odd branch address and access exceptions due to fetching of the instruction at the branch location are not recognized as part of the branch operation but instead are recognized as exceptions associated with the execution of the instruction at the branch location.

A branch instruction, such as BRANCH AND SAVE, can designate the same general register for branch address computation and as the location of an operand. Branch-address computation is completed before the remainder of the operation is performed.

The program-status word (PSW), described in Chapter 4 "Control" contains information required for proper program execution. The PSW is used to control instruction sequencing and to hold and indicate the status of the CPU in relation to the program currently being executed. The active or controlling PSW is called the current PSW. Branch instructions perform the functions of decision making, loop control, and subroutine linkage. A branch instruction affects instruction sequencing by introducing a new instruction address into the current PSW. The relative-branch instructions with a 16-bit I2 field allow branching to a location at an offset of up to plus 64K-2 bytes or minus 64K bytes relative to the location of the branch instruction, without the use of a base register. The relative-branch instructions with a 32-bit I2 field allow branching to a location at an offset of up to plus 4G-2 bytes or minus 4G bytes relative to the location of the branch instruction, without the use of a base register.

Facilities for decision making are provided by the BRANCH ON CONDITION, BRANCH RELATIVE ON CONDITION, and BRANCH RELATIVE ON CONDITION LONG instructions. These instructions inspect a condition code that reflects the result of a majority of the arithmetic, logical, and I/O operations. The condition code, which consists of two bits, provides for four possible condition-code settings: 0, 1, 2, and 3.

The specific meaning of any setting depends on the operation that sets the condition code. For example, the condition code reflects such conditions as zero, nonzero, first operand high, equal, overflow, and subchannel busy. Once set, the condition code remains unchanged until modified by an instruction that causes a different condition code to be set.

Loop control can be performed by the use of BRANCH ON CONDITION, BRANCH RELATIVE ON CONDITION, and BRANCH RELATIVE ON CONDITION LONG to test the outcome of address arithmetic and counting operations. For some particularly frequent combinations of arithmetic and tests, BRANCH ON COUNT, BRANCH ON INDEX HIGH, and BRANCH ON INDEX LOW OR EQUAL are provided, and relative-branch equivalents of these instructions are also provided. These branches, being specialized, provide increased performance for these tasks.

Subroutine linkage when a change of the addressing mode is not required is provided by the BRANCH AND LINK and BRANCH AND SAVE instructions. (This discussion of BRANCH AND SAVE applies also to BRANCH RELATIVE AND SAVE and BRANCH RELATIVE AND SAVE LONG.) Both of these instructions permit not only the introduction of a new instruction address but also the preservation of a return address and associated information. The return address is the address of the instruction following the branch instruction in storage, except that it is the address of the instruction following an EXECUTE instruction that has the branch instruction as its target.

Both BRANCH AND LINK and BRANCH AND SAVE have an R1 field. They form a branch address by means of fields that depend on the instruction. The operations of the instructions are summarized as follows: In the 24-bit addressing mode, both instructions place the return address in bit positions 40-63 of general register R1 and leave bits 0-31 of that register unchanged. BRANCH AND LINK places the instruction-length code for the instruction and also the condition code and program mask from the current PSW in bit positions 32-39 of general register R1 BRANCH AND SAVE places zeros in those bit positions.

In the 31-bit addressing mode, both instructions place the return address in bit positions 33-63 and a one in bit position 32 of general register R1, and they leave bits 0-31 of the register unchanged.

In the 64-bit addressing mode, both instructions place the return address in bit positions 0-63 of general register R1.

In any addressing mode, both instructions generate the branch address under the control of the current addressing mode. The instructions place bits 0-63 of the branch address in bit positions 64-127 of the PSW. In the RR format, both instructions do not perform branching if the R2 field of the instruction is zero.

It can be seen that, in the 24-bit or 31-bit addressing mode, BRANCH AND SAVE places the basic addressing-mode bit, bit 32 of the PSW, in bit position 32 of general register R1. BRANCH AND LINK does so in the 31-bit addressing mode. The instructions BRANCH AND SAVE AND SET MODE and BRANCH AND SET MODE are for use when a change of the addressing mode is required during linkage. These instructions have R1 and R2 fields. The operations of the instructions are summarized as follows:

BRANCH AND SAVE AND SET MODE sets the contents of general register R1 the same as BRANCH AND SAVE. In addition, the instruction places the extended-addressing-mode bit, bit 31 of the PSW, in bit position 63 of the register.

BRANCH AND SET MODE, if R1 is nonzero, performs as follows. In the 24- or 31-bit mode, it places bit 32 of the PSW in bit position 32 of general register R1, and it leaves bits 0-31 and 33-63 of the register unchanged. Note that bit 63 of the register should be zero if the register contains an instruction address. In the 64-bit mode, the instruction places bit 31 of the PSW (a one) in bit position 63 of general register R1, and it leaves bits 0-62 of the register unchanged.

When R2 is nonzero, both instructions set the addressing mode and perform branching as follows. Bit 63 of general register R2 is placed in bit position 31 of the PSW. If bit 63 is zero, bit 32 of the register is placed in bit position 32 of the PSW. If bit 63 is one, PSW bit 32 is set to one. Then the branch address is generated from the contents of the register, except with bit 63 of the register treated as a zero, under the control of the new addressing mode. The instructions place bits 0-63 of the branch address in bit positions 64-127 of the PSW. Bit 63 of general register R2 remains unchanged and, therefore, may be one upon entry to the called program. If R2 is the same as R1, the results in the designated general register are as specified for the R1 register.

Interruptions (Context Switch):

The interruption mechanism permits the CPU to change its state as a result of conditions external to the configuration, within the configuration, or within the CPU itself. To permit fast response to conditions of high priority and immediate recognition of the type of condition, interruption conditions are grouped into six classes: external, input/output, machine check, program, restart, and supervisor call.

An interruption consists in storing the current PSW as an old PSW, storing information identifying the cause of the interruption, and fetching a new PSW. Processing resumes as specified by the new PSW. The old PSW stored on an interruption normally contains the address of the instruction that would have been executed next had the interruption not occurred, thus permitting resumption of the interrupted program. For program and supervisor-call interruptions, the information stored also contains a code that identifies the length of the last-executed instruction, thus permitting the program to respond to the cause of the interruption. In the case of some program conditions for which the normal response is re-execution of the instruction causing the interruption, the instruction address directly identifies the instruction last executed.

Except for restart, an interruption can occur only when the CPU is in the operating state. The restart interruption can occur with the CPU in either the stopped or operating state.

Any access exception is recognized as part of the execution of the instruction with which the exception is associated. An access exception is not recognized when the CPU attempts to prefetch from an unavailable location or detects some other access-exception condition, but a branch instruction or an interruption changes the instruction sequence such that the instruction is not executed. Every instruction can cause an access exception to be recognized because of instruction fetch. Additionally, access exceptions associated with instruction execution may occur because of an access to an operand in storage. An access exception due to fetching an instruction is indicated when the first instruction halfword cannot be fetched without encountering the exception. When the first halfword of the instruction has no access exceptions, access exceptions may be indicated for additional halfwords according to the instruction length specified by the first two bits of the instruction; however, when the operation can be performed without accessing the second or third halfwords of the instruction, it is unpredictable whether the access exception is indicated for the unused part. Since the indication of access exceptions for instruction fetch is common to all instructions, it is not covered in the individual instruction definitions.

Except where otherwise indicated in the individual instruction description, the following rules apply for exceptions associated with an access to an operand location. For a fetch-type operand, access exceptions are necessarily indicated only for that portion of the operand which is required for completing the operation. It is unpredictable whether access exceptions are indicated for those portions of a fetch-type operand which are not required for completing the operation.

For a store-type operand, access exceptions are recognized for the entire operand even if the operation could be completed without the use of the inaccessible part of the operand. In situations where the value of a store-type operand is defined to be unpredictable, it is unpredictable whether an access exception is indicated. Whenever an access to an operand location can cause an access exception to be recognized, the word "access" is included in the list of program exceptions in the description of the instruction. This entry also indicates which operand can cause the exception to be recognized and whether the exception is recognized on a fetch or store access to that operand location. Access exceptions are recognized only for the portion of the operand as defined for each particular instruction.

An operation exception is recognized when the CPU attempts to execute an instruction with an invalid operation code. The operation code may be unassigned, or the instruction with that operation code may not be installed on the CPU. The operation is suppressed. The instruction-length code is 1, 2, or 3. The operation exception is indicated by a program interruption code of 0001 hex (or 0081 hex if a concurrent PER event is indicated).

Some models may offer instructions not described in this publication, such as those provided for assists or as part of special or custom features. Consequently, operation codes not described in this publication do not necessarily cause an operation exception to be recognized. Furthermore, these instructions may cause modes of operation to be set up or may otherwise alter the machine so as to affect the execution of subsequent instructions. To avoid causing such an operation, an instruction with an operation code not described in this publication should be executed only when the specific function associated with the operation code is desired.

A specification exception is recognized when any of the following is true:
1. A one is introduced into an unassigned bit position of the PSW (that is, any of bit positions 0, 2-4, 24-30, or 33-63). This is handled as an early PSW specification exception.
2. A one is introduced into bit position 12 of the PSW. This is handled as an early PSW specification exception.
3. The PSW is invalid in any of the following ways: a. Bit 31 of the PSW is one and bit 32 is zero. b. Bits 31 and 32 of the PSW are zero, indicating the 24-bit addressing mode, and bits 64-103 of the PSW are not all zeros. c. Bit 31 of the PSW is zero and bit 32 is one, indicating the 31-bit addressing mode, and bits 64-96 of the PSW are not all zeros. This is handled as an early PSW specification exception.
4. The PSW contains an odd instruction address.
5. An operand address does not designate an integral boundary in an instruction requiring such integral-boundary designation.
6. An odd-numbered general register is designated by an R field of an instruction that requires an even-numbered register designation.
7. A floating-point register other than 0, 1, 4, 5, 8, 9, 12, or 13 is designated for an extended operand.
8. The multiplier or divisor in decimal arithmetic exceeds 15 digits and sign.
9. The length of the first-operand field is less than or equal to the length of the second-operand field in decimal multiplication or division.
10. Execution of CIPHER MESSAGE, CIPHER MESSAGE WITH CHAINING, COMPUTE INTERMEDIATE MESSAGE DIGEST, COMPUTE LAST MESSAGE DIGEST, or COMPUTE MESSAGE AUTHENTICATION CODE is attempted, and the function code in bits 57-63 of general register 0 contain an unassigned or uninstalled function code.
11. Execution of CIPHER MESSAGE or CIPHER MESSAGE WITH CHAINING is attempted, and the R1 or R2 field designates an odd-numbered register or general register 0.
12. Execution of CIPHER MESSAGE, CIPHER MESSAGE WITH CHAINING, COMPUTE INTERMEDIATE MESSAGE DIGEST or COMPUTE MESSAGE AUTHENTICATION CODE is attempted, and the second operand length is not a multiple of the data block size of the designated function. This specification-exception condition does not apply to the query functions.
13. Execution of COMPARE AND FORM CODEWORD is attempted, and general registers 1, 2, and 3 do not initially contain even values.
32. Execution of COMPARE AND SWAP AND STORE is attempted and any of the following conditions exist:
The function code specifies an unassigned value.
The store characteristic specifies an unassigned value.
The function code is 0, and the first operand is not designated on a word boundary.
The function code is 1, and the first operand is not designated on a doubleword boundary.
The second operand is not designated on an integral boundary corresponding to the size of the store value.
33. Execution of COMPARE LOGICAL LONG UNICODE or MOVE LONG UNICODE is attempted, and the contents of either general register R1+1 or R3+1 do not specify an even number of bytes.
34. Execution of COMPARE LOGICAL STRING, MOVE STRING or SEARCH STRING is attempted, and bits 32-55 of general register 0 are not all zeros.
35. Execution of COMPRESSION CALL is attempted, and bits 48-51 of general register 0 have any of the values 0000 and 0110-1111 binary.
36. Execution of COMPUTE INTERMEDIATE MESSAGE DIGEST, COMPUTE LAST MESSAGE DIGEST, or COMPUTE MESSAGE AUTHENTICATION CODE is attempted, and either of the following is true:
The R2 field designates an odd-numbered register or general register 0.
Bit 56 of general register 0 is not zero.
37. Execution of CONVERT HFP TO BFP, CONVERT TO FIXED (BFP or HFP), or LOAD FP INTEGER (BFP) is attempted, and the M3 field does not designate a valid modifier.
38. Execution of DIVIDE TO INTEGER is attempted, and the M4 field does not designate a valid modifier.
39. Execution of EXECUTE is attempted, and the target address is odd.
40. Execution of EXTRACT STACKED STATE is attempted, and the code in bit positions 56-63 of general register R2 is greater than 4 when the ASN-and-LX-reuse facility is not installed or is greater than 5 when the facility is installed.
41. Execution of FIND LEFTMOST ONE is attempted, and the R1 field designates an odd numbered register.
42. Execution of INVALIDATE DAT TABLE ENTRY is attempted, and bits 44-51 of general register R2 are not all zeros.
43. Execution of LOAD FPC is attempted, and one or more bits of the second operand corresponding to unsupported bits in the FPC register are one.
44. Execution of LOAD PAGE-TABLE-ENTRY ADDRESS is attempted and the M4 field of the instruction contains any value other than 0000-0100 binary.
45. Execution of LOAD PSW is attempted and bit 12 of the doubleword at the second-operand address is zero. It is model dependent whether or not this exception is recognized.
46. Execution of MONITOR CALL is attempted, and bit positions 8-11 of the instruction do not contain zeros.

47. Execution of MOVE PAGE is attempted, and bit positions 48-51 of general register 0 do not contain zeros or bits 52 and 53 of the register are both one.
48. Execution of PACK ASCII is attempted, and the L2 field is greater than 31.
49. Execution of PACK UNICODE is attempted, and the L2 field is greater than 63 or is even.
50. Execution of PERFORM FLOATING POINT OPERATION is attempted, bit 32 of general register 0 is zero, and one or more fields in bits 33-63 are invalid or designate an uninstalled function.
51. Execution of PERFORM LOCKED OPERATION is attempted, and any of the following is true: •The T bit, bit 55 of general register 0 is zero, and the function code in bits 56-63 of the register is invalid. •Bits 32-54 of general register 0 are not all zeros. •In the access-register mode, for function codes that cause use of a parameter list containing an ALET, the R3 field is zero.
52. Execution of PERFORM TIMING FACILITY FUNCTION is attempted, and either of the following is true: •Bit 56 of general register 0 is not zero. •Bits 57-63 of general register 0 specify an unassigned or uninstalled function code.
53. Execution of PROGRAM TRANSFER or PROGRAM TRANSFER WITH INSTANCE is attempted, and all of the following are true: •The extended-addressing-mode bit in the PSW is zero. •The basic-addressing-mode bit, bit 32, in the general register designated by the R2 field of the instruction is zero. •Bits 33-39 of the instruction address in the same register are not all zeros.
54. Execution of RESUME PROGRAM is attempted, and either of the following is true:
  Bits 31, 32, and 64-127 of the PSW field in the second operand are not valid for placement in the current PSW. The exception is recognized if any of the following is true: —Bits 31 and 32 are both zero and bits 64-103 are not all zeros. —Bits 31 and 32 are zero and one, respectively, and bits 64-96 are not all zeros. —Bits 31 and 32 are one and zero, respectively. —Bit 127 is one.
  Bits 0-12 of the parameter list are not all zeros.
55. Execution of SEARCH STRING UNICODE is attempted, and bits 32-47 of general register 0 are not all zeros.
56. Execution of SET ADDRESS SPACE CONTROL or SET ADDRESS SPACE CONTROL FAST is attempted, and bits 52 and 53 of the second-operand address are not both zeros.
57. Execution of SET ADDRESSING MODE (SAM24) is attempted, and bits 0-39 of the un-updated instruction address in the PSW, bits 64-103 of the PSW, are not all zeros.
58. Execution of SET ADDRESSING MODE (SAM31) is attempted, and bits 0-32 of the un-updated instruction address in the PSW, bits 64-96 of the PSW, are not all zeros.
59. Execution of SET CLOCK PROGRAMMABLE FIELD is attempted, and bits 32-47 of general register 0 are not all zeros.
60. Execution of SET FPC is attempted, and one or more bits of the first operand corresponding to unsupported bits in the FPC register are one.
61. Execution of STORE SYSTEM INFORMATION is attempted, the function code in general register 0 is valid, and either of the following is true: •Bits 36-55 of general register 0 and bits 32-47 of general register 1 are not all zeros. •The second-operand address is not aligned on a 4K-byte boundary.
62. Execution of TRANSLATE TWO TO ONE or TRANSLATE TWO TO TWO is attempted, and the length in general register R1+1 does not specify an even number of bytes.
63. Execution of UNPACK ASCII is attempted, and the L1 field is greater than 31.
64. Execution of UNPACK UNICODE is attempted, and the L1 field is greater than 63 or is even.
65. Execution of UPDATE TREE is attempted, and the initial contents of general registers 4 and 5 are not a multiple of 8 in the 24-bit or 31-bit addressing mode or are not a multiple of 16 in the 64-bit addressing mode. The execution of the instruction identified by the old PSW is suppressed. However, for early PSW specification exceptions (causes 1-3) the operation that introduces the new PSW is completed, but an interruption occurs immediately thereafter. Preferably, the instruction-length code (ILC) is 1, 2, or 3, indicating the length of the instruction causing the exception. When the instruction address is odd (cause 4 on page 6-33), it is unpredictable whether the ILC is 1, 2, or 3. When the exception is recognized because of an early PSW specification exception (causes 1-3) and the exception has been introduced by LOAD PSW, LOAD PSW EXTENDED, PROGRAM RETURN, or an interruption, the ILC is 0. When the exception is introduced by SET ADDRESSING MODE (SAM24, SAM31), the ILC is 1, or it is 2 if SET ADDRESSING MODE was the target of EXECUTE. When the exception is introduced by SET SYSTEM MASK or by STORE THEN OR SYSTEM MASK, the ILC is 2.

Program interruptions are used to report exceptions and events which occur during execution of the program. A program interruption causes the old PSW to be stored at real locations 336-351 and a new PSW to be fetched from real locations 464-479. The cause of the interruption is identified by the interruption code. The interruption code is placed at real locations 142-143, the instruction-length code is placed in bit positions 5 and 6 of the byte at real location 141 with the rest of the bits set to zeros, and zeros are stored at real location 140. For some causes, additional information identifying the reason for the interruption is stored at real locations 144-183. If the PER-3 facility is installed, then, as part of the program interruption action, the contents of the breaking-event-address register are placed in real storage locations 272-279. Except for PER events and the crypto-operation exception, the condition causing the interruption is indicated by a coded value placed in the rightmost seven bit positions of the interruption code. Only one condition at a time can be indicated. Bits 0-7 of the interruption code are set to zeros. PER events are indicated by setting bit 8 of the interruption code to one. When this is the only condition, bits 0-7 and 9-15 are also set to zeros. When a PER event is indicated concurrently with another program interruption condition, bit 8 is one, and bits 0-7 and 9-15 are set as for the other condition. The crypto-operation exception is indicated by an interruption code of 0119 hex, or 0199 hex if a PER event is also indicated.

When there is a corresponding mask bit, a program interruption can occur only when that mask bit is one. The program mask in the PSW controls four of the exceptions, the IEEE masks in the FPC register control the IEEE exceptions, bit 33 in control register 0 controls whether SET SYSTEM MASK causes a special-operation exception, bits 48-63 in control register 8 control interruptions due to monitor events, and a hierarchy of masks control interruptions due to PER events. When any controlling mask bit is zero, the condition is ignored; the condition does not remain pending.

When the new PSW for a program interruption has a PSW-format error or causes an exception to be recognized in the process of instruction fetching, a string of program interruptions may occur.

Some of the conditions indicated as program exceptions may be recognized also by the channel subsystem, in which case the exception is indicated in the subchannel-status word or extended-status word.

When a data exception causes a program interruption, a data-exception code (DXC) is stored at location 147, and zeros are stored at locations 144-146. The DXC distinguishes between the various types of data-exception conditions. When the AFP-register (additional floating-point register) control bit, bit 45 of control register 0, is one, the DXC is also placed in the DXC field of the floating-point-control (FPC) register. The DXC field in the FPC register remains unchanged when any other program exception is reported. The DXC is an 8-bit code indicating the specific cause of a data exception.

DXC 2 and 3 are mutually exclusive and are of higher priority than any other DXC. Thus, for example, DXC 2 (BFP instruction) takes precedence over any IEEE exception; and DXC 3 (DFP instruction) takes precedence over any IEEE exception or simulated IEEE exception. As another example, if the conditions for both DXC 3 (DFP instruction) and DXC 1 (AFP register) exist, DXC 3 is reported. When both a specification exception and an AFP register data exception apply, it is unpredictable which one is reported.

An addressing exception is recognized when the CPU attempts to reference a main-storage location that is not available in the configuration. A main-storage location is not available in the configuration when the location is not installed, when the storage unit is not in the configuration, or when power is off in the storage unit. An address designating a storage location that is not available in the configuration is referred to as invalid. The operation is suppressed when the address of the instruction is invalid. Similarly, the operation is suppressed when the address of the target instruction of EXECUTE is invalid. Also, the unit of operation is suppressed when an addressing exception is encountered in accessing a table or table entry. The tables and table entries to which the rule applies are the dispatchable-unit-control table, the primary ASN second-table entry, and entries in the access list, region first table, region second table, region third table, segment table, page table, linkage table, linkage-first table, linkage-second table, entry table, ASN first table, ASN second table, authority table, linkage stack, and trace table. Addressing exceptions result in suppression when they are encountered for references to the region first table, region second table, region third table, segment table, and page table, in both implicit references for dynamic address translation and references associated with the execution of LOAD PAGE-TABLE-ENTRY ADDRESS, LOAD REAL ADDRESS, STORE REAL ADDRESS, and TEST PROTECTION. Similarly, addressing exceptions for accesses to the dispatchable-unit control table, primary ASN-second-table entry, access list, ASN second table, or authority table result in suppression when they are encountered in access-register translation done either implicitly or as part of LOAD PAGE-TABLE-ENTRY ADDRESS, LOAD REAL ADDRESS, STORE REAL ADDRESS, TEST ACCESS, or TEST PROTECTION. Except for some specific instructions whose execution is suppressed, the operation is terminated for an operand address that can be translated but designates an unavailable location. For termination, changes may occur only to result fields. In this context, the term "result field" includes the condition code, registers, and any storage locations that are provided and that are designated to be changed by the instruction.

Figure 6:
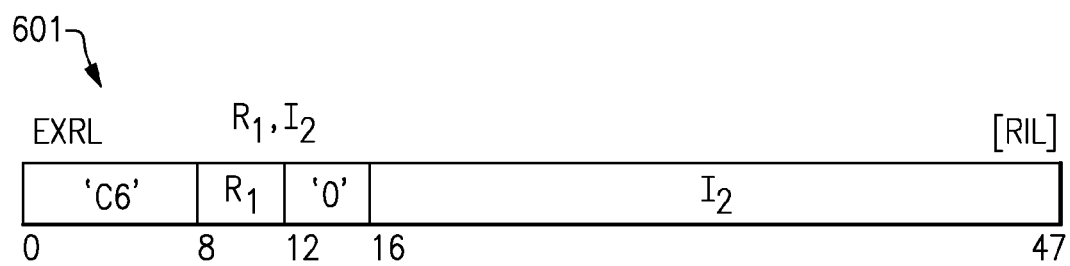
FIG. 6 depicts an instruction format of an embodiment.
Figure 7:
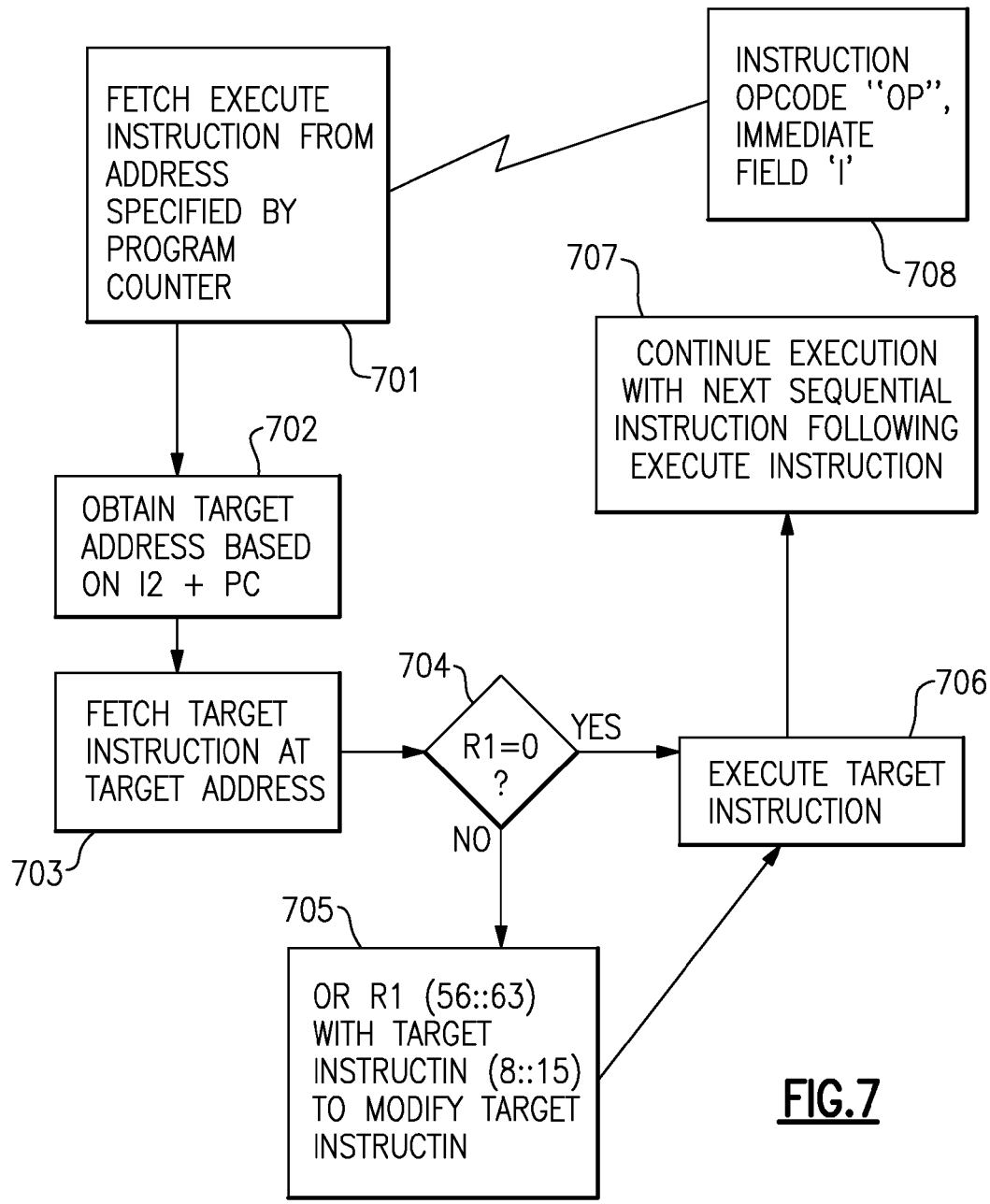
FIG. 7 depicts a flow of an aspect of an embodiment.

Execute Relative Long:

An Execute Relative Long instruction FIG. 6 having FIG. 7 708 an opcode, a register field specifying a register (R1) and an immediate field (I2) provides the ability to execute a single target instruction obtained from a memory location relative to the address of the Execute Relative Long instruction being executed (the program counter value of the PSW). Execute Relative Long is discussed in U.S. patent application Ser. No. 11/972,714, filed Jan. 11, 2008, which patent application is incorporated by reference herein.

FIG. 7, when the Execute Relative instruction is fetched 701 from an address specified by the program counter of the processor executing the instruction and executed, a target instruction is obtained 703 from an target address preferably determined 702 by algebraically adding a sign extended signed immediate value (I2) of the instruction to the current program counter value. When the register (R1) field is not '0' 704, bits 8-15 of a copy of the single target instruction at the second-operand address is modified 705 by bits 56-63 of general register specified by the R1 field of the instruction, and the resulting instruction, called the target instruction, is executed 706. When the register (R1) field is '0' 704, the copy of the single target instruction is executed 706 without being modified.

After executing the single target instruction, the current program counter is incremented by the size of the Execute Relative Long instruction and the next sequential instruction following the Execute Relative Long instruction is fetched and executed (unless the executed instruction is a branch, or unless there is an interruption).

Figure 8:
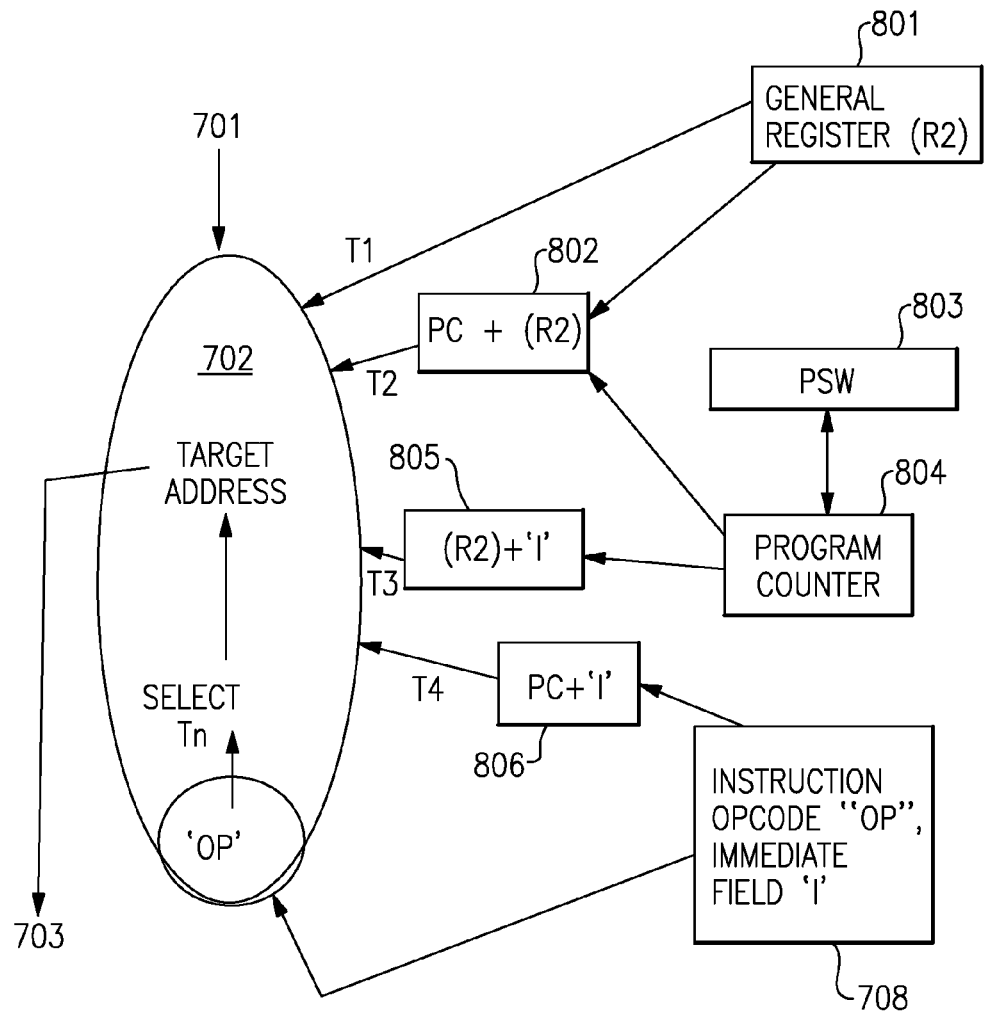
FIG. 8 depicts a flow of another aspect an embodiment.

In an embodiment FIG. 8, the target address of the single target instruction to be executed is determined by the opcode of the instruction and is any one of:

obtained 801 from a second register specified by a second field of the instruction;

obtained 802 from adding the program counter 804 to the value of second register 801 specified by a second field of the instruction, the program counter obtained from a PSW 803;

obtained 805 from adding the program counter 804 to the value of second register 801 specified by a second field of the instruction, the program counter obtained from a PSW 803 added to an immediate field (I2) of the instruction; or obtained 806 from adding the program counter 804 to an immediate field (I2) of the instruction.

Preferably, when the R1 field is not zero, bits 8-15 of the instruction designated by the second-operand address are ORed with bits 56-63 of general register R1. The ORing does not change either the contents of general register R1 or the instruction in storage, and it is effective only for the interpretation of the instruction to be executed. When the R1 field is zero, no ORing takes place.

The target instruction may be two, four, or six bytes in length as specified by the opcode of the target instruction. The execution and exception handling of the target instruction are exactly as if the target instruction were obtained in normal sequential operation, except for the instruction address and the instruction-length code. The EXECUTE RELATIVE LONG instruction of the invention may co-exist with other execute-type instructions including the EXECUTE instruction of the z/Architecture.

The instruction address in the current PSW is increased by the length of the execute-type instruction (6 bytes for EXECUTE RELATIVE LONG), unless the executed instruction causes a branch to occur. If the target instruction does not specify a next instruction or a program interrupt, execution will continue, after the target instruction is executed, at the instruction address following the Execute Relative Long instruction. This updated address and the instruction-length code of the execute-type instruction are used, for example, as part of the link information when the target instruction is BRANCH AND LINK. When the target instruction is a successful branching instruction, the instruction address in the current PSW is replaced by the branch address specified by the target instruction. When the target instruction is in turn an execute-type instruction, an execute exception is recognized. The effective address of EXECUTE must be even; otherwise, a specification exception is recognized. When the target instruction is two or three halfwords in length but can be executed without fetching its second or third halfword, it is unpredictable whether access exceptions are recognized for the unused halfwords. Access exceptions are not recognized for the second-operand address when the address is odd. Preferably, an access exception causes a context switch to the operating system exception handler.

The second-operand address of an execute-type instruction is an instruction address rather than a logical address; thus, the target instruction is fetched from the primary address space when in the primary-space, secondary-space, or access-register mode as specified in the z/Architecture Principles of Operation.

For EXECUTE RELATIVE LONG, the contents of the 32 bit I2 field are a signed binary integer (preferably sign extended 2's complement when negative) specifying the number of halfwords that is added to the value of the program counter (the address of the Execute Relative Long instruction) to generate the address of the target instruction in storage. The value of the program counter specified by the PSW may be any of 24 bits, 31 bits or preferably 64 bits.

If the target instruction, when executed is architected to set condition codes, the condition codes will be set accordingly. Program exceptions architected for the Execute Relative long instruction or the target instruction will cause the following program exceptions:

Access (fetch, target instruction)
Execute
Operation (EXRL, when the execute-extensions facility is not installed)

The ORing of eight bits from the general register with the designated instruction permits the indirect specification of the length, index, mask, immediate-data, register, or extended-opcode field. The fetching of the target instruction is considered to be an instruction fetch for purposes of program-event recording and for purposes of reporting access exceptions. An access or specification exception may be caused by execute-type instructions or by the target instruction, except that execution of the EXECUTE RELATIVE LONG does not cause a specification exception. When an interruptible instruction is made the target of an execute-type instruction, the program normally should not designate any register updated by the interruptible instruction as the R1, X2, or B2 register for EXECUTE or R1 register for EXECUTE RELATIVE LONG. Otherwise, on resumption of execution after an interruption, or if the instruction is refetched without an interruption, the updated values of these registers will be used in the execution of the execute-type instruction. Similarly, the program should normally not let the destination field in storage of an interruptible instruction include the location of an execute-type instruction, since the new contents of the location may be interpreted when resuming execution.

Modify Next-Sequential-Instruction (MNSI) Instruction:

It would be desirable to provide a program with a way to dynamically provide parameters to instructions to be executed. One way would be to store the instruction to be executed when the parameters are known. This would be disruptive to execution since processor pipelines would have to handle changing instructions already fetched for execution. Dynamically controlling instruction parameters may be useful for programs that are written that utilize variable length structures such as tables. For example, a program may wish to dynamically create a table of a certain length or insert a value in a location within the table. The Execute instructions of the z/Architecture Principles of Operations ISA from IBM (described above) are capable of modifying bits 8-15 of a fetched target instruction (located by information provided in the Execute instruction) and executing the modified fetched target instruction, however, subsequent to executing the modified fetched target instruction, program execution continues at the instruction following the Execute instruction (the next-sequential-instruction (NSI). Thus, the use of the Execute instruction disrupts the sequential execution of the processor, causing performance degradation. If an Execute instruction specified the NSI as the target instruction, the effect of executing a modified fetched NSI by the Execute instruction would be overridden by the subsequent execution of the actual unmodified NSI when continuing the execution stream. Furthermore, the Execute is limited to only modifying a predetermined field (bits 8-15) of the target fetched instruction. In an environment program may wish to dynamically assign operands, assign immediate field values (such as length field values), extend a range of facilities (such as general registers) beyond the ISA (instruction set architecture) limit or otherwise dynamically manipulate fields of an instruction.

Figure 9:
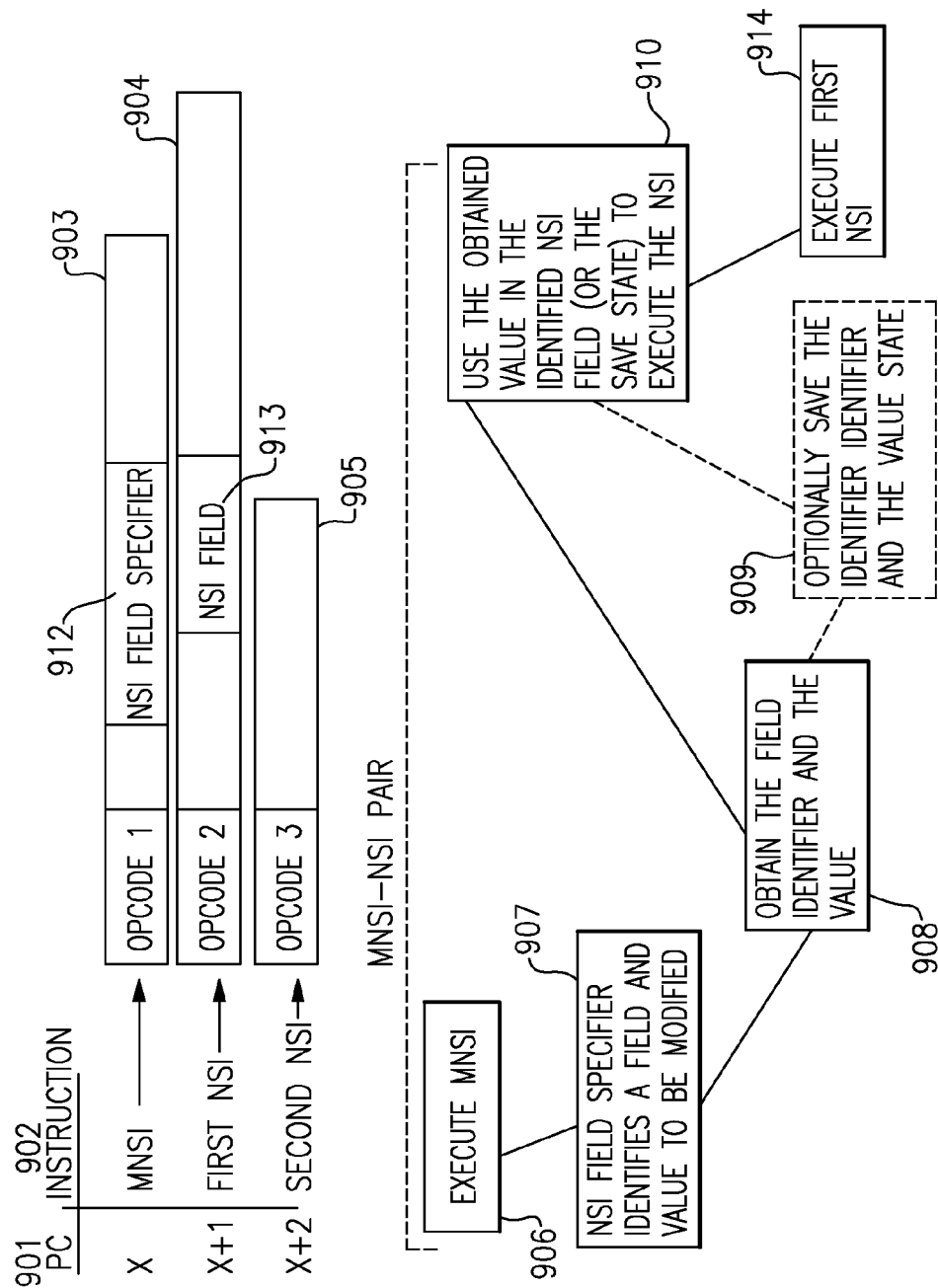
FIG. 9 depicts a flow of a MNSI-NSI sequence.

A Modify-next-sequential-instruction (MNSI) instruction provides a solution. Referring to FIG. 9, in an embodiment, a Modify-next-sequential-instruction (MNSI) Instruction 903 is a prefix instruction, prefixed to the next sequential instruction (NSI) 904 and extending the capability of the NSI 904. The NSI instruction is any instruction of a program that directly follows another instruction, of the program, in program order. In an embodiment, the MNSI instruction, when executed, modifies a fetched copy of the NSI for execution. The actual NSI in storage may not be modified by the execution of the MNSI instruction. Thus, a branch instruction, having the NSI instruction as a target, that causes the same NSI to be executed without executing the MNSI instruction that precedes it, will execute the original NSI no matter how many times the NSI had been previously executed after execution of the MNSI instruction.

In another embodiment, the MNSI instruction 903, when executed, modifies the actual NSI 904 in storage, to be executed, Thus, a branch instruction that causes the same NSI to be executed without executing the MNSI instruction that precedes it, will execute the NSI as modified by a previous execution of an MNSI instruction.

In one embodiment, the MNSI instruction specifies a field of the NSI to be modified as well as a value to use in the modification. In another embodiment, the MNSI instruction specifies more than one field of the NSI to be modified, and respective values to use in the modification. In yet another embodiment, sequential MNSI instructions provide a cumulative modification of an NSI. For an example, in an embodiment that does not recognize a MNSI as an NSI to be modified, a first MNSI followed by a second MNSI followed by a NSI in program order are a sequence of 3 instructions. The first MNSI at address x provides a first value and a first field to be modified in an NSI. The second MNSI at address x+1 provides a second value and a second field to be modified, The NSI at address x+2 is the first NSI that is not an MNSI encountered in the string, and is fetched and the first field specified by the first MNSI as well as the second field specified by the second MNSI are modified in the fetched NSI. The modified fetched NSI is then executed. In an embodiment, no interruption (except a specification exception) is permitted between executing an MNSI and an actual NSI (non-MNSI) instruction.

In one embodiment, the field of the NSI to be modified is implied by MNSI instruction, where the MNSI only modifies an architecture defined field of the NSI. In one embodiment, the MNSI comprises a register field for locating a general register containing the location within the NSI to be modified. In one embodiment, the MNSI implicitly identifies a register containing the location within the NSI to be modified. In another embodiment, the MNSI includes one or more immediate fields for identifying the location within the NSI to be modified. The one or more immediate fields may indicate which field of the NSI is to be modified, by, for example indicating a '1' for a first register field, and a '2' for a second register field, or, in an embodiment, two immediate fields may specify a range of bits of the NSI that are to be modified. Other methods, known in the art, can be employed for specifying, by the MNSI, a field of the NSI to be modified.

In one embodiment, the value to be used to modify the NSI is implied, for example, the NSI has a 4 bit register field for identifying one of 16 registers. In a machine that employed 32 registers, the MNSI instruction could cause the NSI to alternately access the first 16 or the second 16 of the 32 registers. Thus, the programmer places the MNSI before an NSI instruction to cause the NSI instruction to "bank switch" between the two halves of the 32 registers. In another embodiment, the value to be used in the modified NSI is provided by an immediate field of the MNSI instruction. In another embodiment, the value to be used is provided by a register, implicitly or explicitly identified by the MNSI instruction.

In an embodiment, the instruction set architecture (ISA) of an architecture can be extended by way of the MNSI instruction. For example, the MNSI may provide a larger immediate field value to the fetched NSI, than exists in the NSI of the ISA. Thus, a small (8 bit) length field (L) of an NSI may be modified by the MNSI prefix instruction to be larger (16 bits) in length. Alternatively the small (8 bit) L field of the NSI can be bank-switched by appending a high-order 8 bits from the MNSI instruction to form a larger (16 bit) L field. In another embodiment, a small (4 bit) register field of the NSI addressing one of a small number (16) of registers could be modified or bank-switched (as in the L field) to form a larger (6 bit) register field, addressing one of a larger number (64) of registers of the fetched NSI.

Referring to FIG. 9, three sequential instructions are shown for example. The instructions are located, in memory, by program counter (PC) addresses 901 and may be identified by a mnemonic 902. An MNSI instruction 903 at program counter address X is followed by a first NSI instruction at PC address X+1, which is followed by a second NSI at PC address X+2 in program order. The MNSI instruction 903 includes an OPCode 1 field and an NSI field specifier 912. The first NSI 904 includes an OPCode 2 field and an NSI field 913. The second NSI includes an OPCode 3 field. In an embodiment, the execution 906 of the MNSI instruction 903 modifies a field 913 of the copy NSI for execution by providing a substitute value for the field 913. The field may be implicitly or explicitly identified by the MNSI instruction 903. In one embodiment, the MNSI instruction 903 includes an NSI specifier 912 that identifies a field 913 and value of the first NSI 904 to be modified (the NSI field 913). In one embodiment, the MNSI instruction 903 specifies a range of bits of the NSI 904 as the field 913 to be modified. In another embodiment, the MNSI instruction 903 specifies a field type as the field 913 of the NSI 904 (such as R1, register field identifying a register "R" having a first operand "1"; or as R2, register field identifying a register "R" having a second operand "2"; L field, an immediate field specifying a length, displacement or index value; and Opcode field, a mask field etc.). In another embodiment the MNSI instruction 903 may specify a field position (first field, second field or third field) of an NSI instruction 904 as the field 913 to be modified. In another embodiment, the MNSI instruction specifies a source register field.

In an example implementation, the MNSI instruction 903 is fetched for execution, The MNSI 903 is executed 906. In execution, the NSI field specifier 912 identifies 907 a field 913 and a value to be modified in the first NSI 904. The field identifier and value are obtained 908 and used 910 in the NSI field 913 when executing the fetched NSI 904. Subsequent to executing the NSI, another NSI 905 is executed. In an embodiment, the field identifier 912 and value are saved 909 for use in a context switch operation (such that the NSI 904, when executed after the context switch, will be executed with the modified values).

Figure 10:
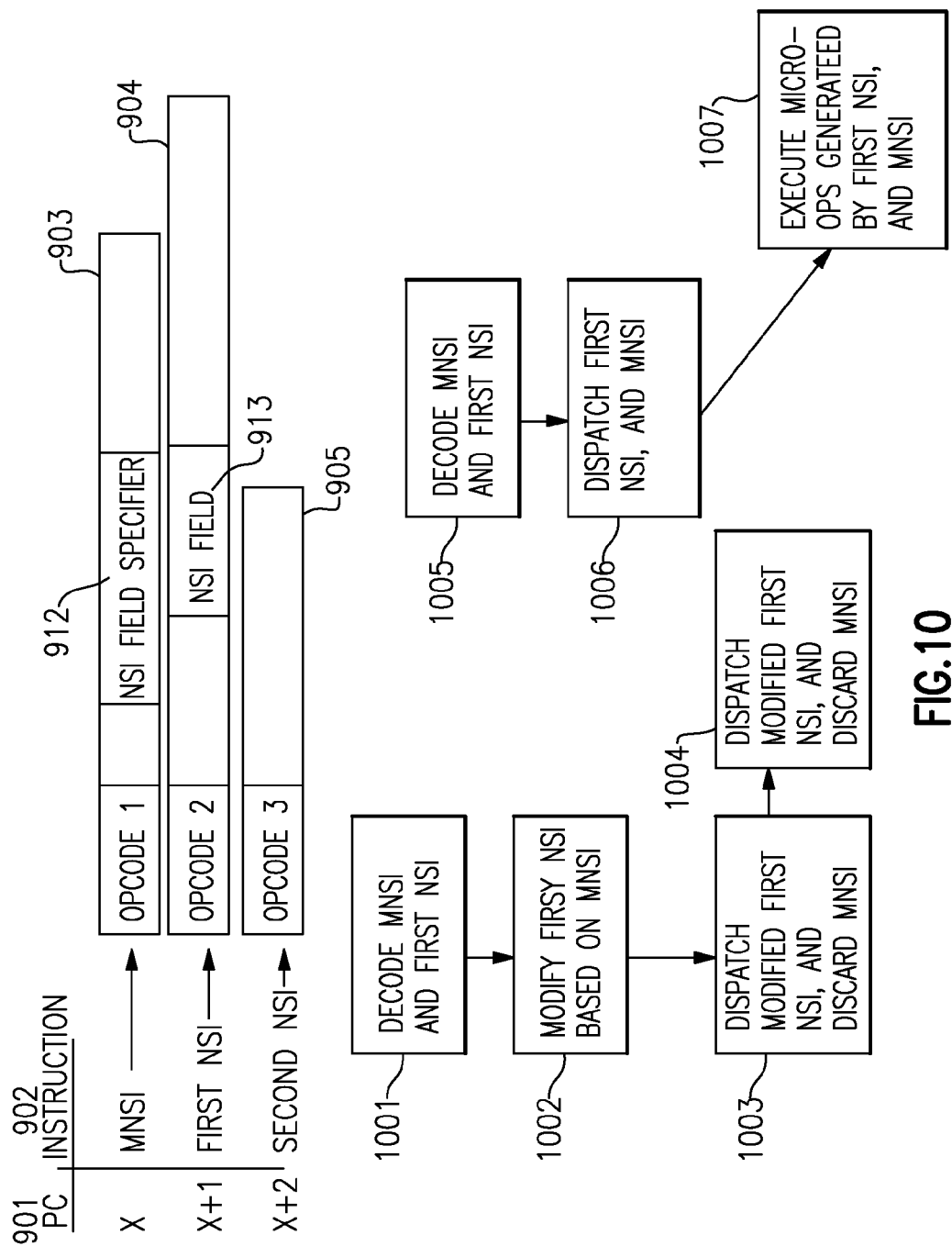
FIG. 10 depicts a flow of embodiments.

Referring to FIG. 10, in an embodiment a processor fetches and effectively executes three sequential instructions in program order. The program order is an MNSI instruction at address x, first NSI at address x+1 then a second NSI at address x+2. Of course, an out-of-order superscalar processor may actually execute the three instructions out-of-program-order but make the results appear as if the instructions were executed in program order by register renaming, conflict resolution and the like. In the case where the first NSI is a branch or jump instruction, the second NSI is not executed in program order.

The processor fetch unit fetches an MNSI instruction 903 and a first NSI instruction 904 and a decode unit decodes 1001 the MNSI instruction 903 and a first NSI 904, the first NSI having an NSI field 913. The NSI field 913 of the fetched first NSI is modified 1002 based on the execution of the MNSI 903 which is discarded (since its execution does not change architecture state of the machine). The modified first NSI is then executed 1004 using the modified field. The second NSI is executed in program order. In an embodiment, the PC is incremented when executing each of the MNSI and NSI instructions.

In an embodiment, a processor decode unit decodes 1005 the MNSI instruction 903 and the first NSI 904. A dispatch unit dispatches 1006 the first NSI 904 and MNSI instruction 903 as micro-ops. An execution executes the micro-ops 1007 generated by the MNSI and first NSI, the micro-ops performing the function of the modified first NSI. In an embodiment, the PC is incremented as if the MNSI and NSI instructions were one large instruction, to point to a second NSI 905.

In an embodiment, the MNSI instruction 903 implicitly specifies a field 913, for example a length field, or for another example, bit positions of the NSI 904. In one example, an instruction set architecture (ISA) has instructions with a length field occurring in bit positions 8-15 but other instructions where 8-15 are not a length field, for example some other instructions have portions of opcode fields (OPCode 2, OPCode 3) in bits 8-15. In this case, if the MNSI instruction 903 specified bits 8-15 of the first NSI 904 as the field 913 to be modified, and the first NSI was structured to have opcode bits (OPCode 2) in bits 8-15, the first MNSI instruction would cause an error exception, however if the first NSI had a length field in bits 8-15, the copy of the first NSI would be modified and executed.

In an embodiment, a code sequence comprises 3 sequential instructions, an MNSI instruction 903 that precedes a first NSI 904 followed by a second NSI 905. A program counter points to the instruction to be executed in sequence.

In an embodiment, an interruption is not permitted between execution of an MNSI instruction 903 and the first NSI 904. In another embodiment, an interruption between an MNSI instruction 903 and the first NSI 904 causes a context switch operation to save the modified copy of the first NSI 904 to be executed and state information indicating the saved copy of the first NSI 904 is to be executed when returning to the interrupted instruction stream. In an embodiment program exceptions are permitted between the MNSI instruction 903 and the first NSI 904 possibly with state information indicating that the first NSI 904 was subject to an MNSI instruction prefix.

In an embodiment, the instructions being executed are defined for a first instruction set architecture (ISA) being emulated by a processor of another ISA, where the execution is performed by one or more native instructions of the another ISA.

In an embodiment, the first ISA is a variable length complex instruction set ISA having instructions of different length, for example, instructions being any of 2 bytes, 4 bytes or 6 bytes in length, while the another ISA is a RISC fixed length ISA having only 32 bit (4 byte) instructions.

In an embodiment, the MNSI instruction 903 specifies 912 a register having the value to use in the first NSI 904. In another embodiment the MNSI instruction 903 specifies a register having a value identifying the NSI field 912 to be modified.

In an embodiment, an error exception is generated when the MNSI instruction 903 specifies a protected field. For example, if the MNSI instruction 903 specifies a field comprising Opcode bits of the NSI 904, an exception is generated. The exception may abort execution of the first NSI.

In an embodiment, the field 913 of the first NSI 904 is replaced by the value specified 912 by the MNSI instruction 903. In another embodiment, the value of the field 913 of the first NSI 904 is operated-on based on the value provided by executing the MNSI 903, where the operation may be an arithmetic or logical operation, for example, an ADD, SUBTRACT, SHIFT, ROTATE or one of a logical OR, AND or EXCLUSIVE OR operation.

In an embodiment wherein the MNSI instruction 903 is a prefix instruction, the MNSI instruction 903 and the NSI instruction 904 may be combined by the processor executing the instructions, to be executed as a single instruction. In one embodiment, an immediate value of the NSI instruction 904 that is provided in a register by the MNSI instruction 903 is represented as a direct register operand by the combined instruction where the MNSI prefix instruction and the NSI instruction are executed as a single instruction.

For example, in a non-limiting exemplary embodiment, an MNSI instruction 903 providing a length field (L) to a move character (MVC) NSI instruction 904, of the z/Architecture Principles of Operation, as an NSI instruction may be implemented by a single internal move instruction capable of moving a dynamically specified variable number of bytes, or a millicode/microcode routine providing the capability to move a dynamically specified variable number of bytes. The MVC NSI 8 bit L field is replaced (or appended) with an L field provided by the MNSI instruction resulting in a 16 bit effective L field of the fetched MVC NSI. Thus, the ISA limit of the MVC instruction to move 256 bytes from one location to another location in memory is extended to provide an effective fetched MVC instruction having a 16 bit L field capable of moving up to 64K bytes from one location to another location in memory.

In another example, an MNSI or combined sequential MNSIs could cause the effective modified MVC NSI to not only have a greater L field than provided by the ISA, but also could provide a bank-switch or extended set of registers beyond the 16 provided by the ISA.

Millicode is code comprising instructions that are invisible to an application programmer for emulating execution of a millicoded instruction of an instruction set architecture (ISA). Millicode is different from firmware in that Millicode instructions are fetched from memory and executed by the processor and are therefore similar to application programs except Millicode is transparent to a programmer. In an example, Millicode comprises instructions of an ISA and special instructions, not part of the ISA. Millicode is typically used to execute complex instruction set computer (CISC) instructions. A program may not be able to tell whether an instruction is being executed by Millicode instructions, microcode ops or hardware circuits. In an embodiment, MNSI and NSI pairs are executed in whole or in part by Millicode routines.

In an embodiment where emulation of an ISA is performed on a platform of another ISA, the MNSI instruction 903 and the NSI instruction 904 are translated to a single instruction in the another ISA. In another implementation of the MNSI and NSI instruction in the another ISA, the MNSI and NSI instruction pair are implemented by a single instruction sequence, either implemented as an inline sequence of instructions, or as a subroutine.

Figure 13:
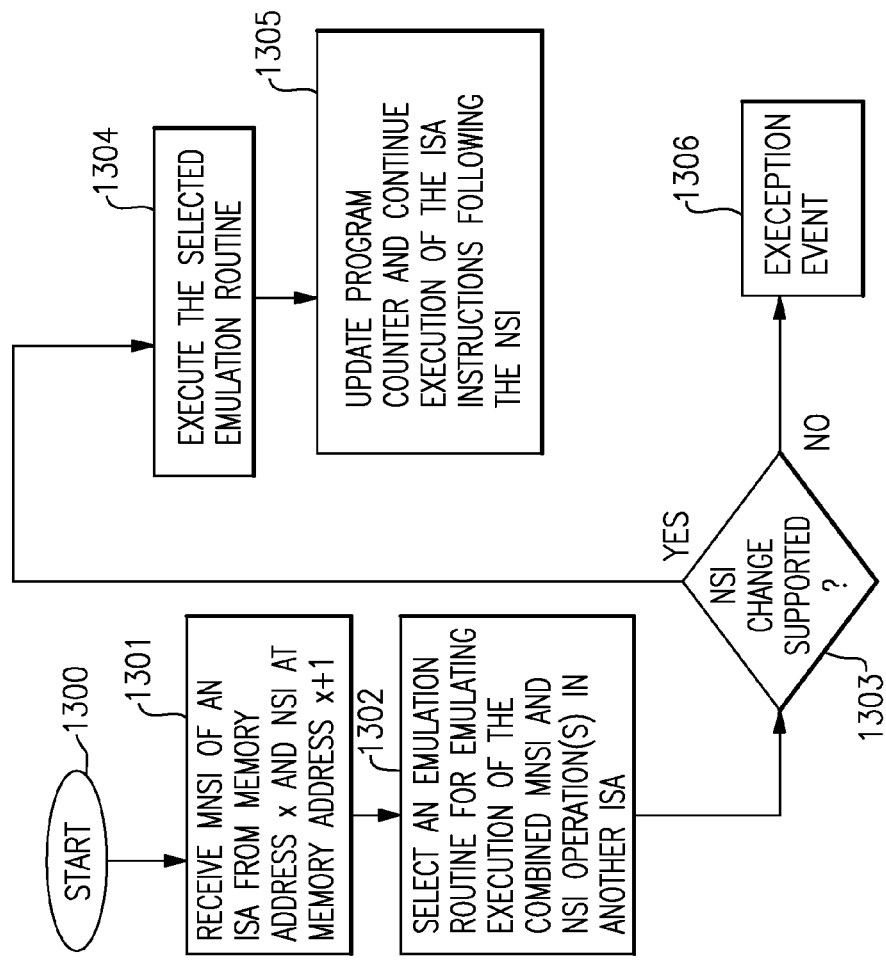
FIG. 13 depicts a flow of an embodiment.

Referring to FIG. 13, at the start 1300, an MNSI of an ISA is received 1301 from Memory address x, and an NSI is received from memory address x+1. An emulation routine is selected 1302 based on the MNSI and the NSI for emulating the execution of the combined MNSI and NSI operation(s) using instructions of another ISA. If 1303 the NSI change specified by the MNSI and NSI instructions is supported, the selected emulation routine is executed 1304 and the PC is updated 1305 to continue execution of the ISA instructions following the NSI. If 1303, the NSI change is not supported, an exception event is triggered 1306.

In an embodiment, in a non-limiting exemplary embodiment, an MNSI instruction providing a length to an MVC instruction as an NSI instruction may be implemented by a single move instruction (or set of processor micro-ops) capable of moving a dynamically specified variable number of bytes, or a millicode or emulation subroutine providing the capability to move a dynamically specified variable number of bytes.

Figure 11:
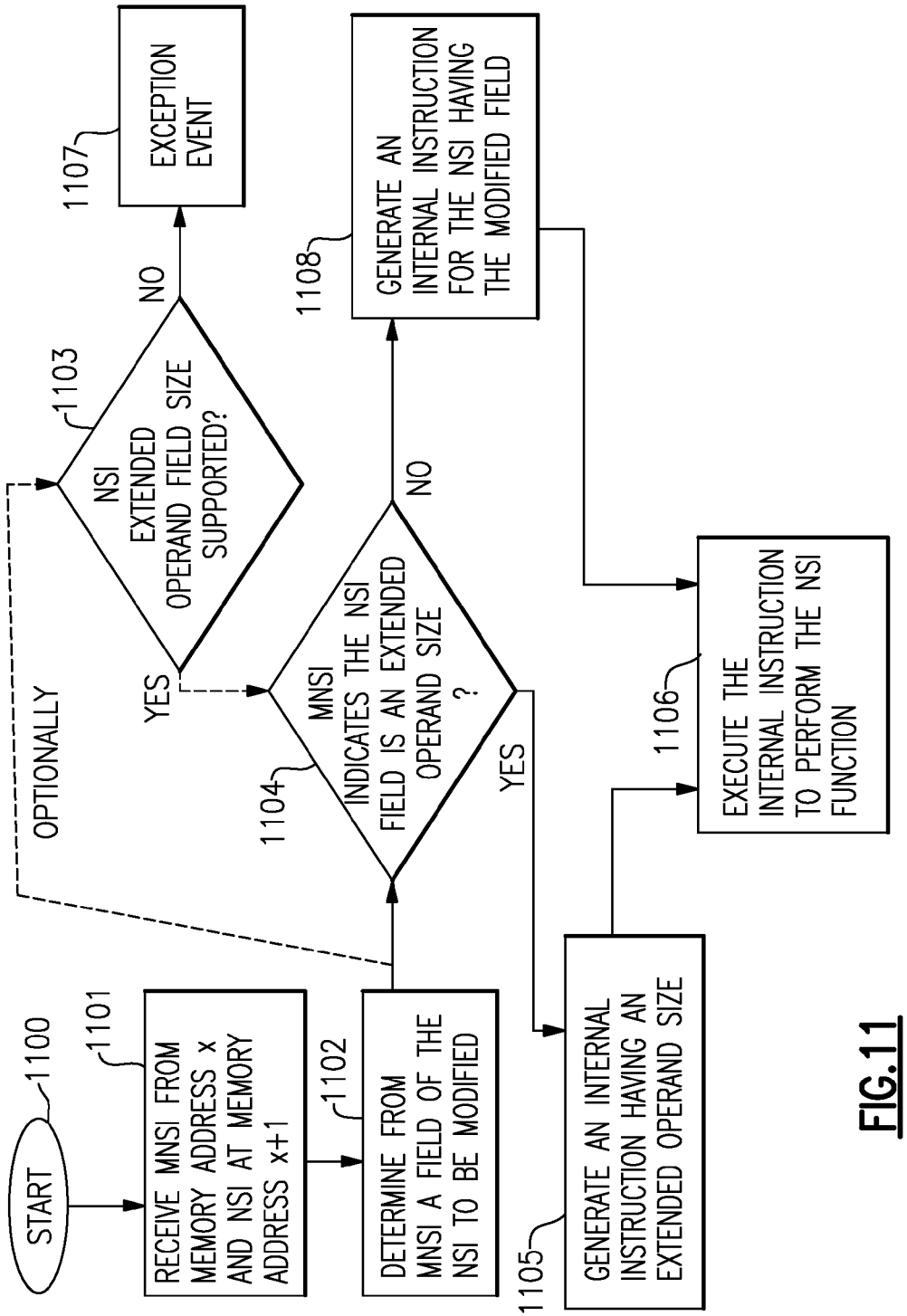
FIG. 11 depicts a flow extending a range of an NSI.

In an embodiment, an MNSI instruction can extend the range of an instruction of an ISA. Referring to FIG. 11, at the start 1100, an MNSI instruction 903 is received 1101 from Memory address X and an NSI 904 from Memory address x+1. A determination 1102 is made from the received MNSI instruction of a field of the NSI to be modified. If 1104, the MNSI instruction indicates the NSI field is an extended operand size, an internal instruction(s) or (internal ops) is generated 1105 having an extended operand size. The internal instruction(s) are executed to perform the NSI function using the extended operand size. Thus, for example, an NSI of an ISA has a 4 bit register field to address 16 registers, the MNSI specifies a 6 bit register field, enabling the NSI to effectively address 64 registers.

In an embodiment, a test 1103 is performed to determine if the NSI extended operand field size is supported, and, if not, an exception event 1107 is triggered.

In an embodiment, if 1104 the MNSI indicates the NSI field is not an Extended operand size, an internal instruction(s) is generated 1108 for executing the NSI having the modified field. The internal instruction(s) is executed 1106 to perform the NSI function.

Figure 12:
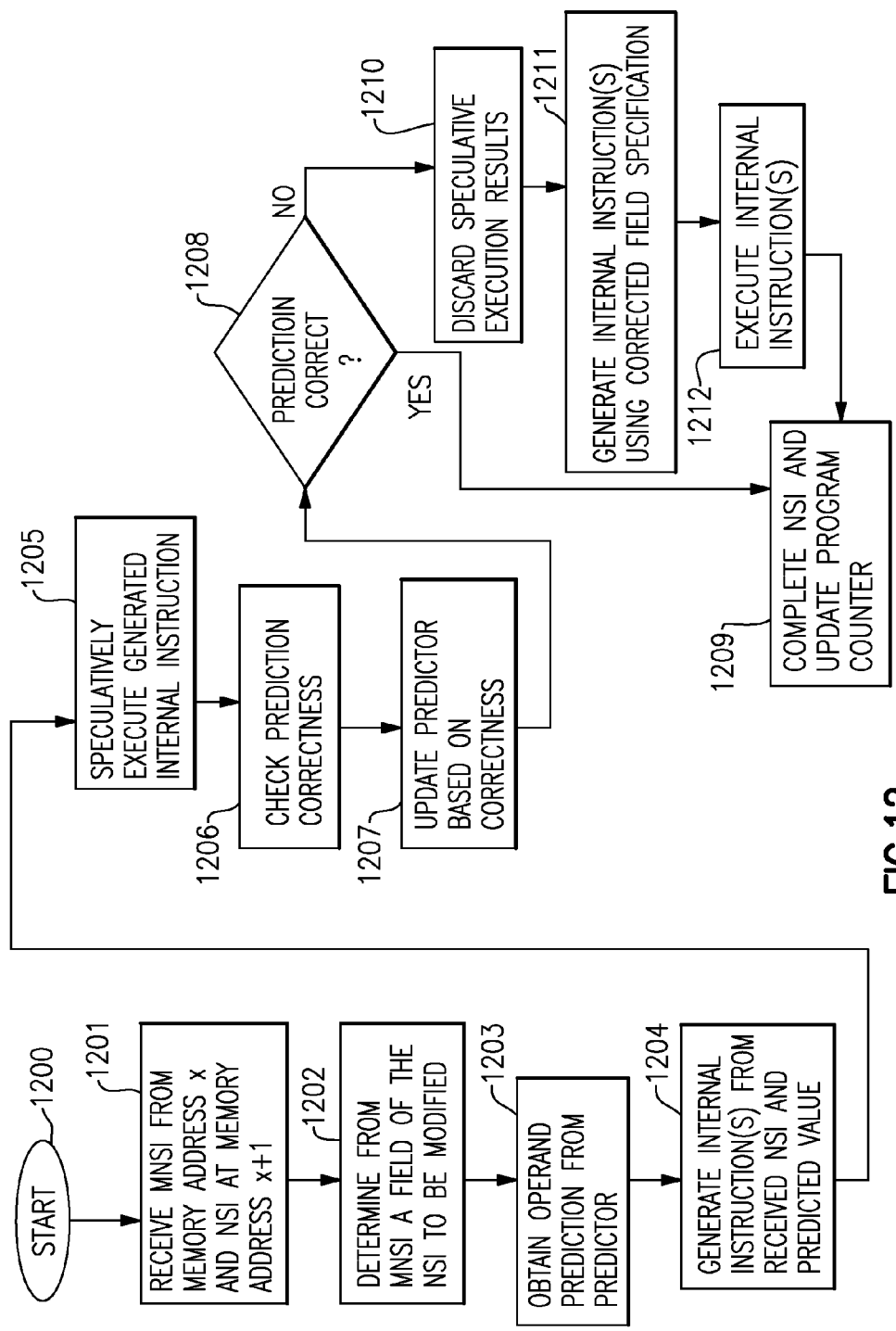
FIG. 12 depicts a flow for an MNSI prediction embodiment.

In an embodiment, a prediction is made of an operand value to be used in the NSI. Referring to FIG. 12, at the start 1200, an MNSI instruction is received 1201 from memory address x and an NSI from memory address x+1. A determination is made 1202 from the MNSI of a field of the NSI to be modified. An operand is obtained 1203 using an operand predictor, for example, the predictor might predict the operand is the same as previously used by an NSI having the same modification. An internal instruction(s) is generated 1204 from the NSI and the predicted value. The internal instruction is speculatively executed 1205. The correctness of the prediction is verified 1206 and the predictor is updated 1207 based on the correctness. If 1208 the prediction was correct the NSI is completed 1209 and the PC is updated. If 1208 the prediction was incorrect, the speculative execution results are discarded 1210, an internal instruction(s) is generated 1211 using a corrected fields specification, obtained from the MNSI. The internal instruction(s) is executed 1212, and the NSI is completed 1209 and the PC updated to point to the instruction following the NSI.

In an embodiment, an MNSI instruction 903 has a parameter indicating whether to modify a non-compliant parameter to a limited field (e.g., by computing a modulo, signed saturating or unsigned saturating value) or to augment the semantics of an NSI 904 by enabling the NSI 904 with a parameter that is out of range with respect to the original specification of the instruction.

In yet another embodiment, two MNSI instructions are provided, one limited to in-range values according to the ISA, and one providing the ability to enable NSIs with out of range parameters, beyond the ISA capability. In one embodiment, an MNSI instruction is equipped with the ability to enable only a limited set of NSIs with an out of range capability.

In an embodiment, when the value needed to modify the NSI is not available at decode time, the modified NSI instruction uses a predicted value when executing. In one aspect of such embodiment, a prediction check is performed, and a recovery operation is initiated when a misprediction has been detected. The modified NSI instruction is completed when the correct value is confirmed.

In the preceding, the modified fetched NSI may not physically be a new NSI instruction having the modifications. The term is used herein to simplify explanation of aspects of the invention. the modified fetched NSI may be implemented as any one of a firmware routine, a software routine, a plurality of micro-ops unique to the processor circuitry, or a new expanded form of the NSI as best suits the processor design.

In an embodiment, the fetched NSI instruction is not physically modified by the MNSI instruction instruction, but the MNSI instruction causes a state to be instantiated to cause the NSI to use the modified parameter provided by the MNSI instruction in, for instance, a pipelined processor circuit. Thus, for example, the new length field is provided to the pipeline with a tag associating it with the NSI, at the proper stage in the pipeline the new length field is used in place of (or in addition to) the length field of the original NSI.

Figure 14:
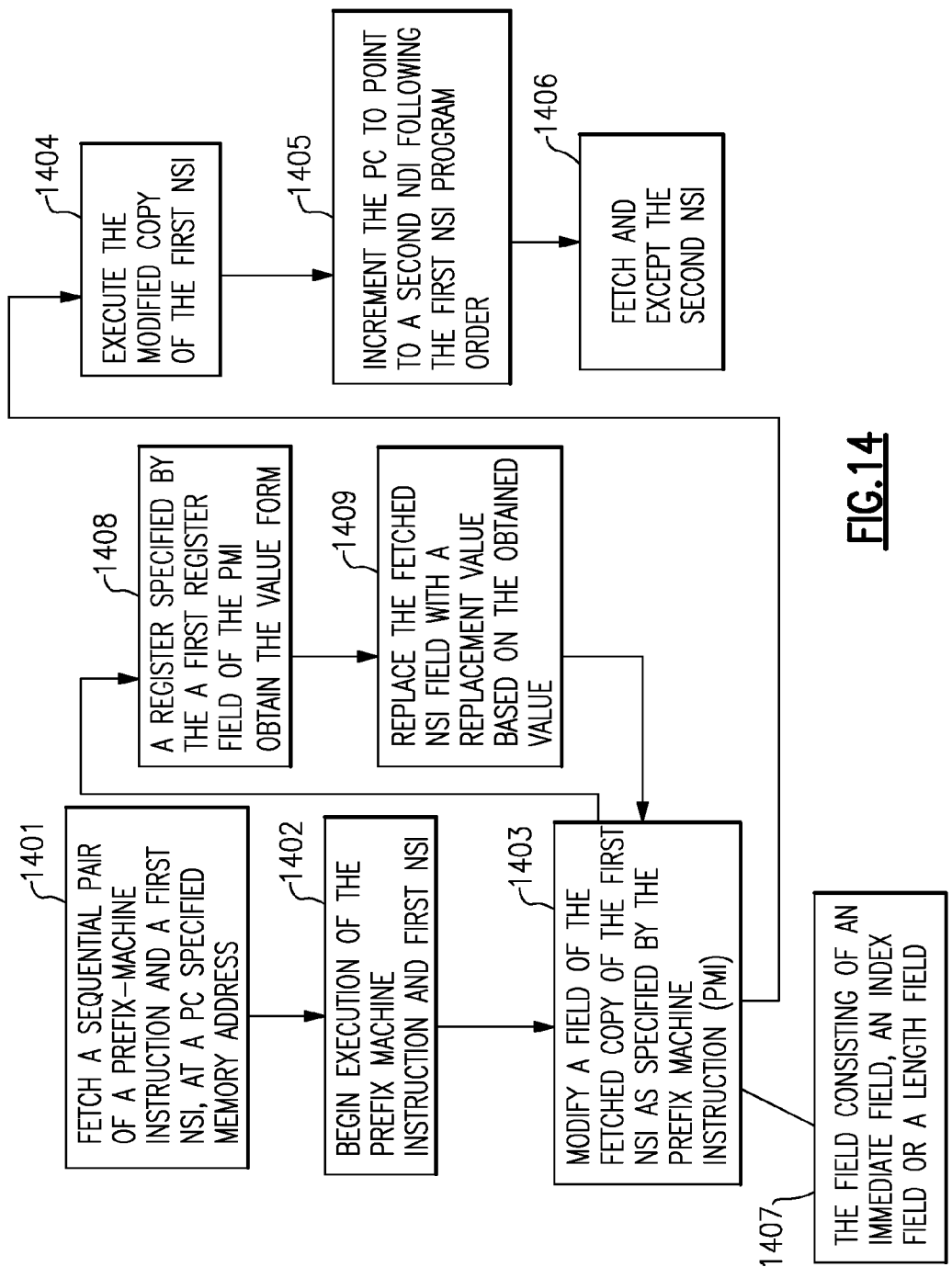
FIG. 14 depicts a flow of an embodiment.

Therefore, referring to FIG. 14, in an embodiment in a computer system, an MNSI prefix machine instruction (PMI) is executed to modify an MNSI specified register of the next sequential instruction following the MNSI in program order. In an embodiment this is accomplished by fetching 1401 at an address specified by a program counter a prefix machine instruction and a first next sequential instruction (NSI), the prefix machine instruction and the first NSI defined for a computer architecture, the first NSI directly following the prefix machine instruction in program order; and executing 1402 the fetched prefix machine instruction and first NSI, the executing comprising: a) modifying 1403 a field of the fetched first NSI based on a value specified by the prefix machine instruction to produce a modified first NSI; and b) executing 1404 the modified first NSI; and c) incrementing 1405 the program counter to point to a second NSI, the second NSI directly following the first NSI in program order; and executing 1406 the second NSI.

In an embodiment 1407, the field of the first NSI consists of any one of an immediate field, an index field or a length field.

In an embodiment, the prefix instruction further comprises a first register field, the modifying further comprises: obtaining 1408 the value from a register specified by the first register field; and replacing 1409 the field of the fetched first NSI with a replacement value based on the value specified by the prefix machine instruction (PMI).

Figure 15:
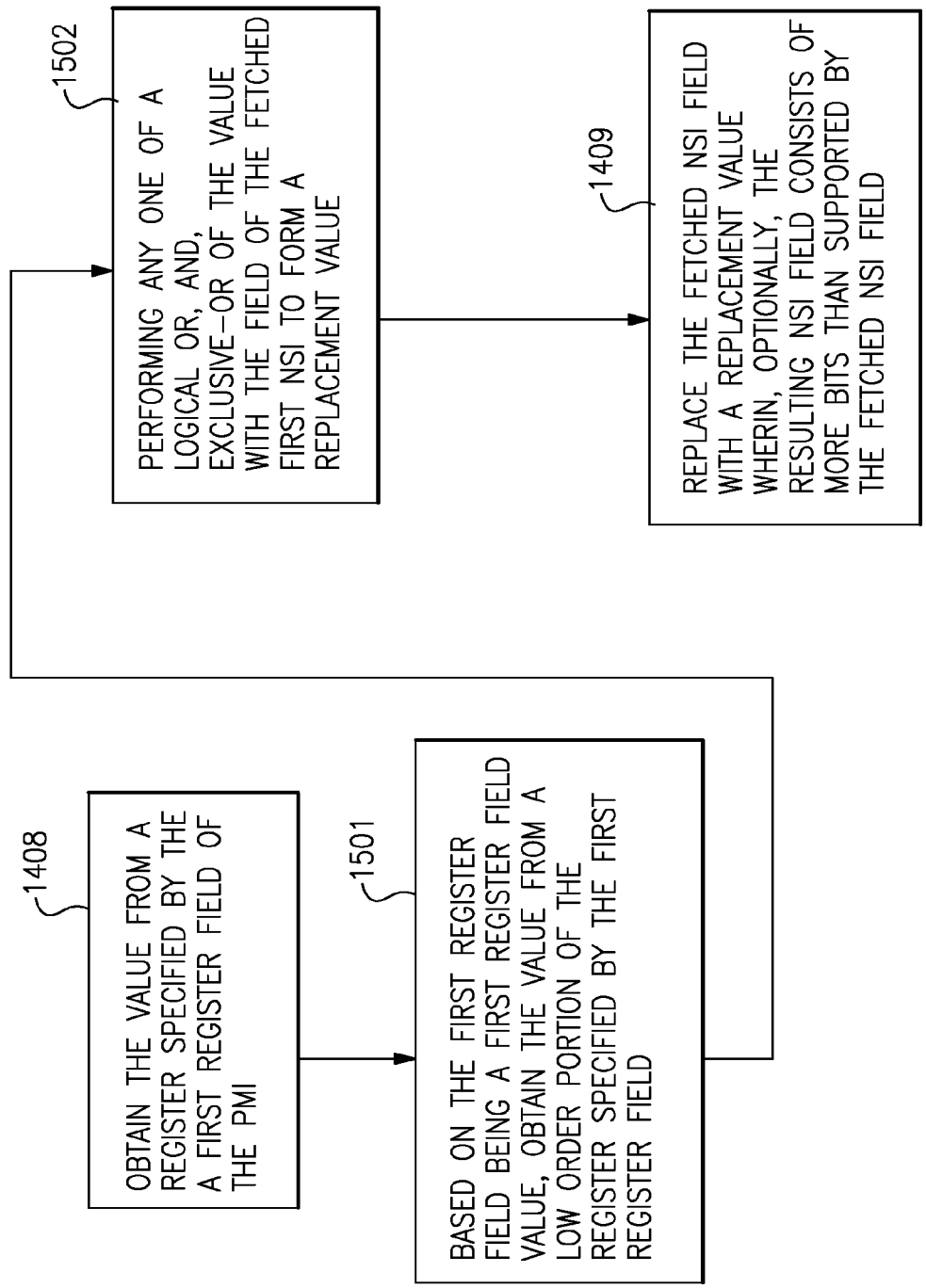
FIG. 15 depicts a flow of an embodiment.

Referring to FIG. 15, in an embodiment, based on the first register field being any one of one or more first register field values, the modifying 1403 further comprises: obtaining 1501 the value from a low order portion of the register specified by the first register field;

performing 1502 any one of a logical OR, AND or EXCLUSIVE OR of the value with the field of the fetched first NSI to form the replacement value.

Figure 16:
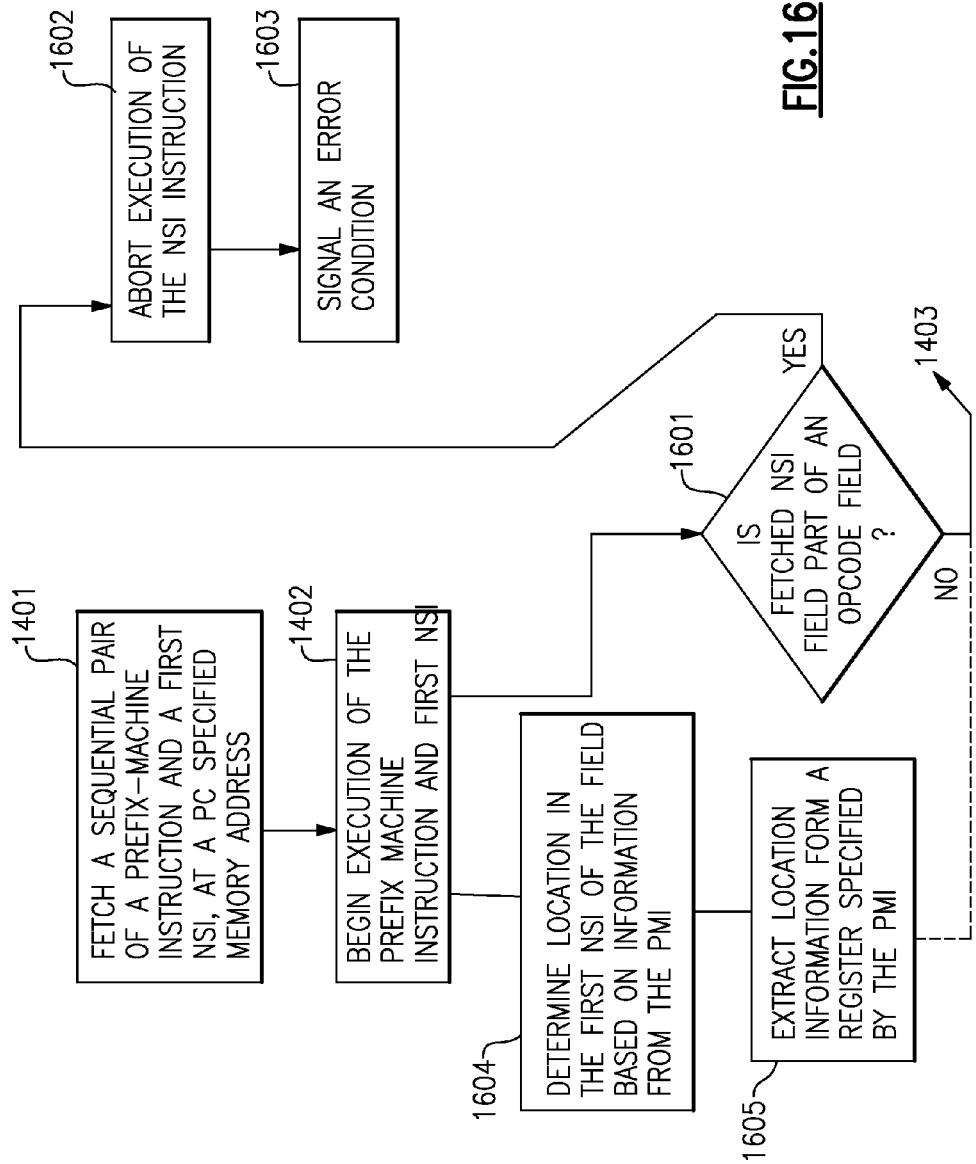
FIG. 16 depicts a flow of an embodiment.

Referring to FIG. 16, in an embodiment, based on an opcode field of the first NSI comprising bits of the field of the fetched first NSI 1601, the fetched prefix machine instruction is executed and first NSI is aborted 1602 and an error condition is signaled 1603.

In an embodiment, based on information provided by the prefix machine instruction, a location in the fetched first NSI of the field of the fetched first NSI is determined.

In an embodiment, the information is extracted 1605 from a register specified by the prefix machine instruction, the information defining the location of the field of the first NSI.

In an embodiment, the field of the modified NSI is larger 1409 than the field of the NSI wherein the field of the modified NSI comprises a value greater than any value supported by the field of the NSI.

A prefix instruction has advantages over an optional prefix appended to an instruction, which may only perform limited overrides of operand sizes, or address sizes, or branch hints for example. A prefix instruction can specify a more complex modification of the next sequential instruction using the contents of a general purpose register to replace fields in the next sequential instruction for example. This allows the runtime loading of the general purpose register which makes the modification dynamic by the program to any of many different possibilities. If a move instruction is next sequential instruction then it could have its length set to any length dynamically determined by a program whereas normally the length must be determined at latest at compile time. Furthermore, a prefix instruction can be implemented using an instruction length already used in the ISA. Thus, the hardware need not provide for a new length of instruction to implement new features. For example, in the zArchitecture Principles of Operation ISA from IBM, three instruction widths are supported (2 byte, 4 byte and 6 byte instruction widths). In that ISA, an instruction always includes an opcode field in the first bytes, the opcode having 2 bits that specify the length of the instruction. The processor can take advantage of this to determine where the next instruction begins, by interrogating the 2 bits of the opcode that are always in the same first byte of all instructions of the ISA for example.

A prefix instruction could be created that dynamically determines which instruction to modify. There can be a counter to modify X instructions ahead where X is a runtime variable determined by the contents of a general purpose register in an embodiment. Even a range could be specified such as modify future instructions in program order, from X instructions ahead to Y instructions ahead where each are variables given by specified general purpose registers for example. The modification could be to modify the length field of this range of instructions to be a specified value from a third general purpose register.

The forgoing is useful in understanding the terminology and structure of one computer system embodiment. The present invention is not limited to the z/Architecture or to the description provided thereof. The present invention can be advantageously applied to other computer architectures of other computer manufacturers with the teaching herein.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer implemented method comprising:
   fetching, by a processor, at an address specified by a program counter a prefix machine instruction and a first next sequential instruction (NSI), the prefix machine instruction and the first NSI defined for a computer architecture, the first NSI directly following the prefix machine instruction in program order;
   executing the fetched prefix machine instruction and first NSI, the executing comprising a)-c):
   a) modifying a field of the fetched first NSI based on a value specified by the prefix machine instruction to produce a modified first NSI;
   b) executing the modified first NSI; and
   c) incrementing the program counter to point to a second NSI, the second NSI directly following the first NSI in program order; and
   executing the second NSI.

2. The method according to claim 1, wherein the field of the first NSI consists of any one of an immediate field, an index field or a length field.

3. The method according to claim 1, wherein the prefix instruction further comprises a prefix register field, the modifying further comprising:
   obtaining the value from a register specified by the prefix register field; and
   replacing the field of the fetched first NSI with a replacement value based on the value specified by the prefix machine instruction.

4. The method according to claim 3, wherein
   based on the prefix register field being any one of one or more prefix register field values, the modifying further comprises:
   obtaining the value from a low order portion of the register specified by the prefix register field; and
   performing any one of a logical OR, AND or EXCLUSIVE OR of the value with the field of the fetched first NSI to form the replacement value.

5. The method according to claim 3, wherein the method further comprises:
   based on an opcode field of the first NSI comprising bits of the field of the fetched first NSI, aborting executing the fetched prefix machine instruction and first NSI and signaling an error condition.

6. The method according to claim 3, wherein the method further comprises:
   based on information provided by the prefix machine instruction, determining a location in the fetched first NSI of the field of the fetched first NSI.

7. The method according to claim 6, wherein the method further comprises:
   extracting the information from a register specified by the prefix machine instruction, the information defining the location of the field of the first NSI.

8. The method according to claim 1, wherein the field of the modified first NSI is larger than the field of the first NSI, wherein the field of the modified first NSI comprises a value greater than any value supported by the field of the first NSI.

* * * * *